United States Patent [19]

Hirose et al.

[11] Patent Number: 4,873,541

[45] Date of Patent: Oct. 10, 1989

[54] IMAGE FORMING APPARATUS

[75] Inventors: Yoshihiko Hirose; Tomohiro Aoki, both of Yokohama; Kazuyoshi Chiku; Yasushi Murayama, both of Tokyo; Takashi Uchida, Yokohama; Kunihiko Matsuzawa, Kawasaki; Kazunori Kanekura, Yokohama, all of Japan

[73] Assignee: Canon Kabushiki Kaisha, Tokyo, Japan

[21] Appl. No.: 313,362

[22] Filed: Feb. 21, 1989

Related U.S. Application Data

[63] Continuation of Ser. No. 198,736, May 25, 1988, abandoned.

[30] Foreign Application Priority Data

| | | | |
|---|---|---|---|
| May 28, 1987 | [JP] | Japan | 62-132915 |
| Aug. 6, 1987 | [JP] | Japan | 62-196581 |
| Aug. 6, 1987 | [JP] | Japan | 62-196582 |

[51] Int. Cl.[4] ............ G01D 15/00

[52] U.S. Cl. ............ 346/160.1; 346/153.1

[58] Field of Search ............ 346/136, 153.1, 157, 346/160.1; 355/15, 14 SH, 14 CH; 101/DIG. 3; 400/119; 358/300

[56] References Cited

U.S. PATENT DOCUMENTS

| | | | |
|---|---|---|---|
| 4,257,700 | 3/1981 | Tsuda et al. | 355/3 TR |
| 4,260,236 | 4/1981 | Tsuda et al. | 355/3 R |
| 4,357,618 | 11/1982 | Ragland | 346/153.1 |
| 4,531,828 | 7/1985 | Hoshino | 355/3 SH |
| 4,615,613 | 10/1986 | Gorsin | 355/15 |

FOREIGN PATENT DOCUMENTS

| | | | |
|---|---|---|---|
| 3217461 | 11/1983 | Fed. Rep. of Germany | 346/160.1 |
| 54137347 | 6/1988 | Japan | 346/160.1 |

*Primary Examiner*—Arthur G. Evans

*Attorney, Agent, or Firm*—Fitzpatrick, Cella, Harper & Scinto

[57] ABSTRACT

An image forming apparatus such as a laser beam printer has a plurality of movable image carrying members such as photosensitive drums, an image forming member such as a laser beam scanner capable of forming on the image carrying members images of different colors correspoding to image information, and transfer devices for sequentially transferring the image carried by the image carrying members to an image receiving member such that the image of different colors are superposed. The image receiving member may be copy paper or an overhead projector sheet, and is fed by a feeding device in the form of an endless belt. A lifting device is provided to move the feeding device from an operative position to at least one retracted position in response to detection of jamming or when an image receiving member having a large heat capacity is used.

37 Claims, 16 Drawing Sheets

| | |
|---|---|
| FIG. 8 (A) | FIG. 8 (B) |

IMAGE FORMING APPARATUS

This application is a continuation of application Ser. No. 198,736 filed May 25, 1988, now abandoned.

BACKGROUND OF THE INVENTION

1. Field of the Invention

The present invention relates to an image forming apparatus of the type in which an image formed in an image forming station is transferred to an image receiving member which is fed by feeding means to the image forming station, whereby an image is obtained on the image receiving member. More particularly, the present invention is concerned with an image forming apparatus suitable for use in the formation of a color image, by causing the image receiving member to pass through a plurality of image forming stations so that images of different colors are superposed on the image receiving member so as to form the color image on the image receiving member. It is to be noted, however, that the invention can be applied to various types of apparatuses, although a color image forming apparatus is a preferred embodiment of the invention and is disclosed in the specification.

2. Description of the Related Art

In general, a known image forming apparatus relying upon an electrophotographic process has an image forming station in which a latent image corresponding to image information is formed on an image forming medium such as an electrophotographic material, developing means in which the lateral image is developed to become a visible image, feeding means for feeding an image receiving member to the image forming station so as to enable the image on the image forming medium to be transferred to the image receiving member, and fixing means for fixing the image on the image receiving member.

The feeding means used in this type of image forming apparatus is generally classified into two types: a first type which comprises pairs of rollers disposed in the path of the image receiving member and adapted to nip the image receiving member therebetween, and a second type in which the image receiving member is placed on and fed by belt-type feeding members which extend between an inlet for the image receving member and the inlet of the fixing device. The feeding means of the first type is disadvantageous in that the end of the image receiving members tends to be damaged because it is repeatedly pinched by the successive pairs of rollers. Thus, the first type of the feeding means is unsatisfactory when considering feeding speed and adaptability of a variety of image receiving members. In addition, the length of the image receiving member that can be fed by this feeding means is undesirably limited by the span or spacing of the roller pairs, thus posing a restriction in the size of the image receiving member.

The second type of feeding means employs belt-type feeding members (conveyor belts) which feed the image receiving member from a pick-up position to an image transfer position where the image is to be transferred from the image forming medium, and thence to a fixing device. The belt-type feeding member than continues back to the pick-up position thereby defining a closed path. This type of feeding device is advantageous in that the risk for erroneously or wrongly feeding the image receiving member is remarkably suppressed as compared with the first type of the feeding means by virtue of the fact that the image receiving member is stably held on the feeding belts which run between the image receiving member inlet and the inlet of the fixing device. It is also to be noted that the first type of feeding means relying upon the roller pairs suffers from problems such as electrostatic charging of the image receiving member because of the presence of many sliding contacts between the image receiving member and stationary parts of the image forming apparatus. The sliding contact also poses a problem in that paper dust tends to be generated when the image receiving member is a sheet of paper. The second type of the feeding means relying upon feeding belts is free from these problems.

The second type of feeding means, i.e., the belt-type feeding means, however, encounters the following problems, though it offers the above-described advantages. One of these problems pertains to the contamination of the surface of the feeding belts, while another pertains to difficulty in recovering the normal state of operation in the event of a feeding failure. The contamination of the surfaces of the feeding belts causes problems such as contamination of the reverse side of the image receiving member and reduction in the efficiency of the transfer of the image from the surface of the image forming medium to the surface of the image receiving member. In most cases, the contamination of the surfaces of the feeding belts is attributable to deposition of toner particles, mainly the toner particles which have fallen from the developing means at these position above the feeding belt, but also from toner particles which have been transferred from the surface of the image forming medium to the belt surfaces. The heaviest contamination of the surfaces of the feeding belts is caused when an image receiving member which has jammed or failed to be fed properly is removed. In such a case, the portion of the image which still remains on the photosensitive member is transferred directly to the surfaces of the feeding belts.

For these reasons, feeding means which incorporate the feeding belts generally require a feeding belt cleaning device for the purpose of removing toner particles from the surfaces of the feeding belts, thereby to clean the surfaces of the belts. The cleaning of the surfaces of the belts, however, is generally difficult due to the fact that the feeding belts have been charged by a transfer charger, particularly when a large quantity of the toner particles has been deposited on the surfaces of the belts as in the case of the direct transfer of the toner particles from the image forming medium. It is, therefore, necessary to pass the contaminated portions of the feeding belts a plurality of times through the belt cleaning device.

The other problem, i.e., the difficulty in removing an image receiving member that has jammed or failed to be properly fed is attributable to the fact that, for the purpose of removing the image receiving member, it is necessary to lift the feeding belt mechanism which is heavier and larger than the other type of feeding mechanism, so as to create a space which is ample enough to allow the operator's hand to access the image receiving member. Thus, the operator is required to lift the heavy feeding mechanism.

Another problem encountered with the belt-type feeding means is that the separation of the image receiving member from the feeding belts is extremely difficult because the image receiving means is held on the belts by means of electrostatic attracting force. A mechanical and forcible separation may result in damaging the surfaces of the feeding belts.

Thus, the feeding means relying upon feeding belts inevitably encounters the above-mentioned problems, that is, the difficulty in the removal of the image receiving member which has jammed or failed to be properly fed and deterioration of the quality of the image due to contamination of the feeding belts, although this type of feeding means provides excellent feeding performance.

Referring now to the fixing means, there are broadly two types of fixing means: a heat-type fixing means which welds an image to the image receiving member by application of heat, and pressure-type fixing means which fixes the image by application of pressure. The heat-type fixing means provides much higher fixing performance and, therefore, is more popular than the pressure-type fixing means. Among various heat-type fixing devices, the most widely used is a fixing device of the type called heat-roller fixing device which makes use of a pair of heated rollers through the nip of which the image receiving member is passed so as to be heated to fix the image thereon, because this type of fixing device offers superior fixing effect and economical use of energy.

The fixing device of the heat-roller type, however, encounters the following problems. Namely, when a long image receiving member is used, the leading end of the image receiving member nipped between the heat rollers is vibrated by these rollers and the vibration propagates along the image receiving member to affect adversely the transfer of the image which is being conducted on a downstream portion of the image receiving member, resulting in a degradation of the image. Another problem is that the fixing performance is determined by the heat capacity of the image receiving member.

In order to obviate these problems, a known feeding device is designed such that the peripheral speed of the heat rollers is selected to be slightly lower than the speed of the image receiving member so that a loop of the image receiving member is formed between the fixing rollers and the feeding device so as to cut off the propagation of vibration, thus preventing degradation of the image quality. In order to overcome the problem concerning the heat capacity, attempts have been made to determine the rate of heat input so that it matches for the heat capacity of the image receving member most often used. When an image receiving member of a greater heat capacity is used, the feed speed of the heat rollers is reduced to increase the heat input to the image receving member per unit time, thus improving the fixing effect. This countermeasure, however, poses another problem. Namely, when an image receving member having a large heat capacity, e.g., a resin sheet, a post card, a cardboard or the like, is used in combination with the heat-roller type fixing device, a large difference is caused between the peripheral speed of the fixing rollers which are operating at a reduced speed and the speed of the feeding device. In particular, when the image receiving member is long, a large loop of the image receiving member if formed in the portion upstream of the fixing rollers so that the image receiving member interferes with the path of the image which has not been fixed yet, with the result that the toner image collapses or feeding fails due to propagation of the loop and due to the stiffness of the image receiving member. In order to overcome this problem, various measures have to be taken such as widening the inlet of the fixing device or providing a large space along the feed path of the image receiving member. Such measures, however, undesirably increase the size of the image forming apparatus and reduce the rigidity thereof.

Thus, problems still remain unsolved, even when the best feeding and fixing means are employed.

SUMMARY OF THE INVENTION

Accordingly, an object of the present invention is to provide an image forming apparatus having feeding means which, in the event of a feeding failure, enable the image receiving member to be removed very easily and promptly.

Another object of the present invention is to provide an image forming apparatus.

Still another object of the present invention is to provide an image forming apparatus which overcomes the problems encountered with known apparatuses such as disturbance of unfixed toner image on a loop of the image receiving member between feeding means and fixing means, and feeding failure attributable to springing back of the loop.

A further object of the present invention is to provide an image forming apparatus which is capable of providing images of high quality regardless of the type of the image receiving member.

A still further object of the present invention is to provide an image forming apparatus which reduces problems such as wear at the region of contact between the image forming medium and the feeding means, as well as contamination by ozone.

According to certain aspects of the invention, an image forming apparatus is provided with image forming means, including image carrying means, for forming an image corresponding to image information on the image carrying means. Transfer means transfer the image carried on the image carrying means to an image receiving member, the image receiving member being fed by feeding means to a position for transfer by the transfer means. The image forming apparatus also includes moving means for moving the feeding means between at least two positions: a first position where the feeding means is operable with the image carrying means, and a second position where the feeding means is not operable with, or is retracted from, the image carrying means. Additional mechanisms operate to clean the feeding means when the feeding means is in the second position, to support the feeding means so that the feeding means may be withdrawn from the image forming apparatus when the feeding means is in the second position, to move the feeding means to an additional, further retracted, third position, and to detect jamming of the image receiving member so that the feeding means may be moved to the second position if a jam is detected.

These and other objects, features and advantages of the present invention will become clear from the following description when the same is read in conjunction with the accompanying drawings.

DESCRIPTION OF THE PREFERRED EMBODIMENTS

Figure 1:
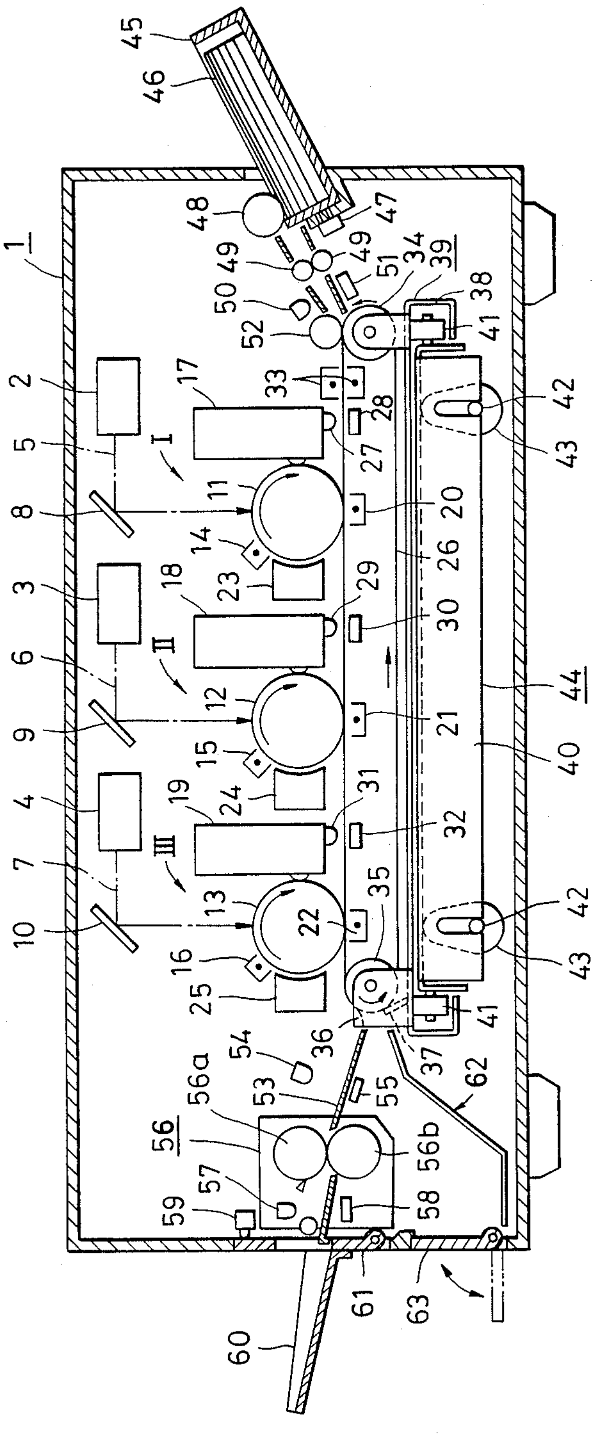
FIG. 1 is a schematic sectional view of a full-color laser beam printer as an embodiment of the image forming apparatus of the present invention.

A laser beam printer of electrophotographic type, as an embodiment of the image forming apparatus of the present invention, will be described hereinafter with reference to the accompanying drawings.

As is well known to those skilled in the art, a laser beam printer for producing a full-color image comprises a plurality of image forming stations arranged in a side-by-side fashion so as to form toner images of, for example, three colors including magenta, cyan and yellow. Through an electrophotographic process making use of a modulated laser beam as the light source, the color images are superposed sequentially on a common image receiving member so that a full-color image is formed by subtractive mixture of colors.

The laser beam printer to which the invention pertains is designed to produce full-color images using the above-described principle. The construction and operation of this laser beam printer will be described with reference to FIG. 1.

The laser beam printer, generally designated at 1, has three image forming stations I, II and III under which is disposed image receiving member feeding device 39 which has an endless feeding belt for feeding an image receiving member to which an image is to be transferred. A fixing device 56 disposed at the outlet of the feeding device 39 has a pair of heat rollers 56*a* and 56*b* for cooperation with each other in thermally fixing an image on the image receiving member. The image forming stations I, II and III have electrophotographic photosensitive drums 11,12 and 13 adapted to rotate at a predetermined speed and to serve as image carrying members, chargers 14, 15 and 16, developing devices 17,18 and 19, transfer chargers 20,21,22 and cleaners 23,24 and 25, respectively.

In operation, an original image to be recorded is color-separated into red, blue and green color components and three image signals corresponding to these color components are input to the image forming stations. The image signals of the respective color components are serially input to the image forming stations.

To explain in more detail, the image signals of the green, red and blue components are sequentially input with a suitable time interval. When the image signals are input to the laser beam printer 1 from an external device, the first image signal, i.e., the image signal of the green color component, is input to a laser scanner 2 of the image forming station I.

The laser scanner 2 operates in response to the image signal of the green color component so that the laser diode incorporated in the laser scanner 2 emits as laser beam 5 modulated in accordance with the image signal of the green color component. The laser beam 5 impinges upon a rotating polygon mirror so as to effect parallel scan and is reflected by a reflection mirror 8 so as to be projected onto the surface of the photosensitive drum 11 which is rotating at a predetermined speed, whereby the surface of the photosensitive drum 11 is scanned in the direction perpendicular to the direction of rotation. As a result of this operation of the laser scanner 2, a green color component latent image of the original image is formed on the surface of the photosensitive drum 11.

The latent image thus formed on the surface of the photosensitive drum 11 is developed by a toner of magenta color loaded in the developing device 17, so as to become a visible image. The image which has become visible is transferred by the operation of a transfer charger 20 to an image receiving member 46 which is placed on and fed by a feeding belt 26.

Subsequently, the image signal corresponding to the red color component is input to a laser scanner 3 and a latent image of the red color component of the original image is formed on the photosensitive drum 12 through the same process as that described above. The thus formed latent image is developed by a cyan toner in the developing device 18 so as to become visible. The image of the cyan color is transferred by the operation of a transfer charger 21 so as to be superposed to the magenta color image on the image receiving member 46.

Then, the image signal corresponding to the red color component is input to a laser scanner 4 so that a latent image of this color component of the original image is formed on the photosensitive drum 13. This latent image is developed by yellow toner in the developing device 19 so that a visible image of yellow color is presented on the surface of the photosensitive drum 13. The yellow color image thus formed is transferred by the operation of the transfer charger 22 to the image receiving member 46 which is fed by the feeding belt 26 in the direction of the photosensitive drum 12 so as to be superposed on the cyan color image of the image receiving member 46.

As a result of the described operation, images of the magenta, cyan and yellow color toners are transferred to the image receiving member in a superposed manner. The image receiving member 46 is then sent to the fixing device 56 by means of the feeding belt 26.

The toners of the respective colors on the image receiving member 46 are heated and pressed as the image receiving member 46 passes through the nip between the heated rollers 56*a* and 56*b* in the fixing device 56 so as to be fused to form subtractive mixing of the colors, whereby a full-color image is formed and fixed on the surface of the image receiving member 46. Although in the described embodiment the full-color image is formed by three color image forming stations I, II and III, it will be clear to those skilled in the art that the laser beam printer can have an additional image forming station IV for forming an image with a black toner, downstream from the image forming station III.

In this type of image forming apparatus, it is essential that the images formed in the plurality of image forming stations are exactly transferred to the same portion of the image receiving member, for otherwise the quality of the image will be seriously impaired due to offset of the colors. Therefore, the peripheral speeds of the photosensitive drums 11,12 and 13 and the feeding speed of the feeding belt 26 are controlled very accurately so as to achieve a high degree of synchronization. To this end, encoders are connected to the shafts of the photosensitive drums 11, 12 and 13 and to a drive shaft 35 for driving the feeding belt 26 so as to detect the rotation speed and wow/flutter of the respective members.

A detailed description will be made hereinunder as to the feeding device 39 for feeding the image receiving member in the laser beam printer 1.

A plurality of sheets of the image receiving member 46, cut in a predetermined size, are stacked in a cassette 45. When the cassette is mounted properly on the laser beam printer 1, the cassette 45 presses a cassette detection switch 47 so that a cassette mounting signal is input to a microcomputer in the laser beam printer 1.

The mounting of the cassette 45 on the laser beam printer 1 brings the uppermost image receiving member 46 into pressure contact with a feed roller 48. As the feed roller 48 rotates, the image receiving member 46 is extracted from the cassette 45 due to the difference between the friction acting between the adjacent image receiving members 46 and the friction acting between the feed roller 48 and the image receiving member 46. The image receiving member 46 is then pinched between and fed by a pair of register rollers 49 so that the leading end of the image receiving member 46 comes into the path of light between a lamp 50 and a photosensor 51 which are provided for detecting the leading end of the image receiving member 46. The feed of the image receiving member is continued until the light from the lamp is interrupted, i.e., until the photo-sensor 51 no longer receives the light. When the path of light from the lamp 50 to the photo-sensor 51 is interrupted by the end of the image receiving member 46, the register rollers 49 stop rotating while nipping the image receiving member 46 therebetween.

Then, as the formation of the latent image on the surface of the photosensitive drum 11 is commenced by the operation of the laser scanner 2, the register rollers 49 start to rotate again at such a timing as to enable the transfer of the magenta toner image, so as to feed the image receiving member 46 onto the feeding belt 26.

The feeding belt 26 is made of a transparent or translucent resin dielectric material such as polyurethane. The surface of the feeding belt is charged by an attracting charger 33 so that the feeding belt 26 can stably feed the image receiving member 46. Furthermore, the feeding belt 26 and the image receiving member 46 are pressed between a pressing roller 52 and an idler roller 34 so that the image receiving member 46 is stably held on the feeding belt 26 without undulations or waves, and without the formation of any space between feeding belt 26 and receiving member 46.

Lamps 27,29 and 31 are provided on the bottoms of the developing devices 17, 18 and 19 which receive the toners of the respective colors, so as to be able to project substantially parallel light beams onto the surface of the feeding belt 26. Photo-diodes 28,30 and 32 are provided opposing lamps 27, 29 and 31 in the space under the feeding belt 26 so as to be able to receive the quantities of light emitted from the lamps 27,29 and 31 and transmitted through the feeding belt 26.

The images of the respective colors are sequentially transferred from the photosensitive drums 11,12 and 13 to the image receiving member 46, and the image receiving member 46 is separated by the operation of the separation claw 36 from the surface of the feeding belt 26. The image receiving member 46 is further fed along a feed path 53 into the fixing device 56 where the color toner image is fixed. The image receiving member 46 with the image fixed thereon is discharged into the tray 60.

On the other hand, the feeding belt 26 from which the image receiving member 46 has been separated is made to pass a region which is in the vicinity of a conductive blade 37 by which the toner particles and the paper powder are removed and charges are eliminated. The arrangement may be such that a suitable cleaning means and a charge eliminating means are provided separately, although in the described embodiment the blade 37 serves both as cleaning means and charge eliminating means.

The described members or parts such as the transfer chargers 20,21, 22, the photodiodes 28, 30, 32, the feeding belt 26, the attracting charger 33, the driven roller 34, the driving roller 35, the separation claw 36, and the conductive blade 37 are assembled as a unit on the frame 38.

The frame 38 is supported by rollers 41 on a lifter frame 40. The lifter frame 40 is supported by cams 43 which are carried by cam shafts 42. As the cam shafts 42 and, hence, the cams 43 rotate, the lifter frame 40 is raised or lowered to change its level as will be seen from FIGS. 1, 2 and 3. The cam shafts 42 are connected to the position sensors so that the vertical position of the lifter frame 40 can be detected on the basis of the signals from the position sensors. The cam shafts 42 are coupled to driving sources through clutch mechanisms which are controlled by a microcomputer provided in the laser beam printer 1.

The lifter frame 40, the rollers 41, the cams 43 and the camshafts 42 together constitute a lifting device 44 serving as moving means for vertically moving the feeding device 39. The lifting device 44 and the feeding device 39 are set such that the feeding belt 26 contacts the surfaces of the photosensitive drums 11,12 and 13 when the feeding device 39 is held at the uppermost position.

Figure 2:
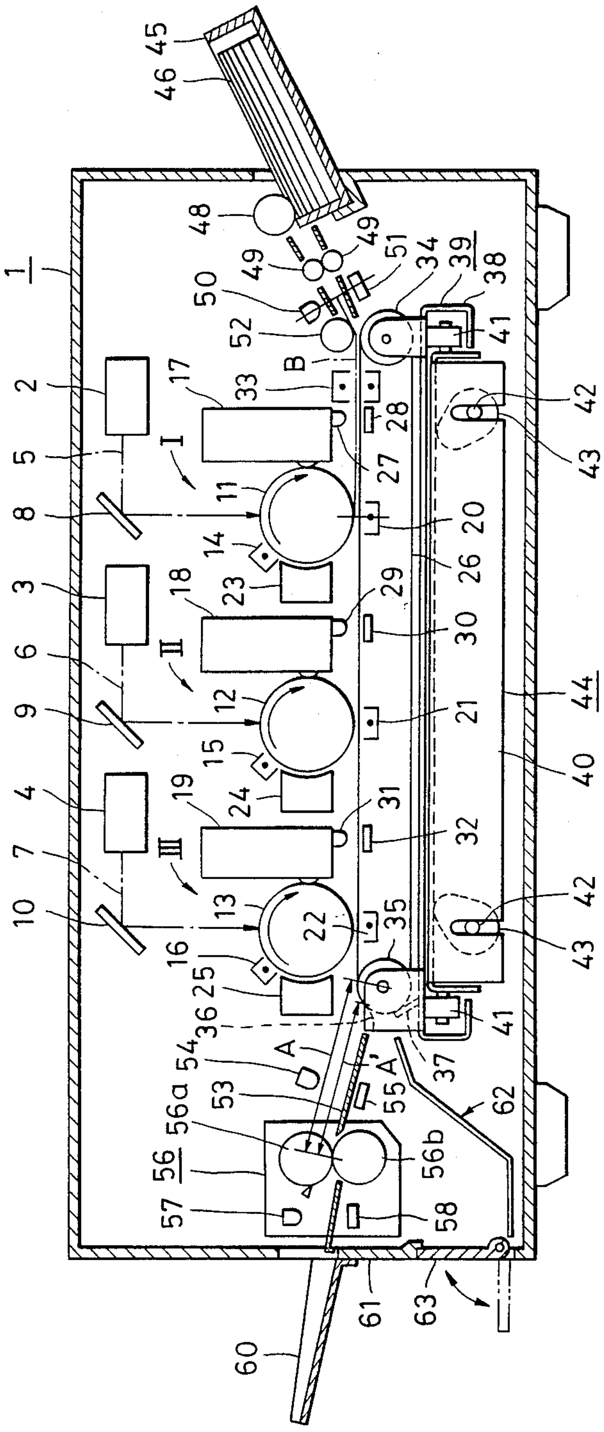
FIG. 2 is a schematic sectional view of the apparatus shown in FIG. 1 with an image receiving member feeding device fixed at an intermediate position.
Figure 4:
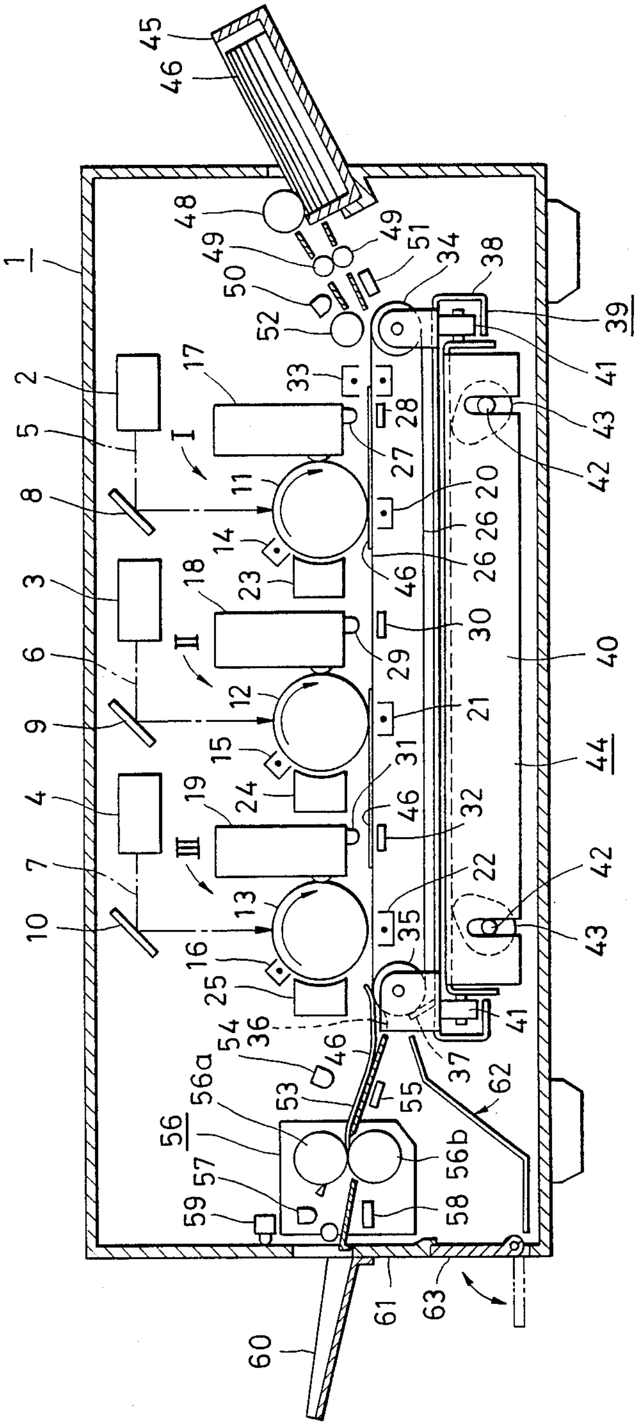
FIG. 4 is a schematic sectional view of the apparatus shown in FIG. 1, illustrating the feed path of the image receiving member formed when the feeding device is set at the position shown in FIG. 2.

Then, as the feeding device 39 is slightly lowered, the feeding belt 26 is moved out of contact with the photosensitive drums 11,12 and 13, as shown in FIG. 2. In this state, the image receiving member 46 can be fed into the fixing means 56 without contacting the photosensitive drums 11,12 and 13. (See FIG. 4).

The position of the feeding device 39 as shown in FIG. 2 will be referred to as "intermediate position" in this specification.

The distance A of feed from the nip between the rollers **56*a*,56*b* of the fixing means 56 to the feeding belt 26 is determined in accordance with the length of the shortest image receiving member which is usable in the laser beam printer. In the described embodiment, the image receiving member 46 is electrostatically attracted onto the feeding belt 26 so that it is stably held on the feeding belt 26 and is fed to the point where the belt loops around the driving roller 35, and where it is separated from feeding belt 26 by claw 36. Therefore, the actual space required to form a loop in the image receiving member is reduced as indicated by A' (FIG. 2**) as compared with the distance A.

Figure 3:
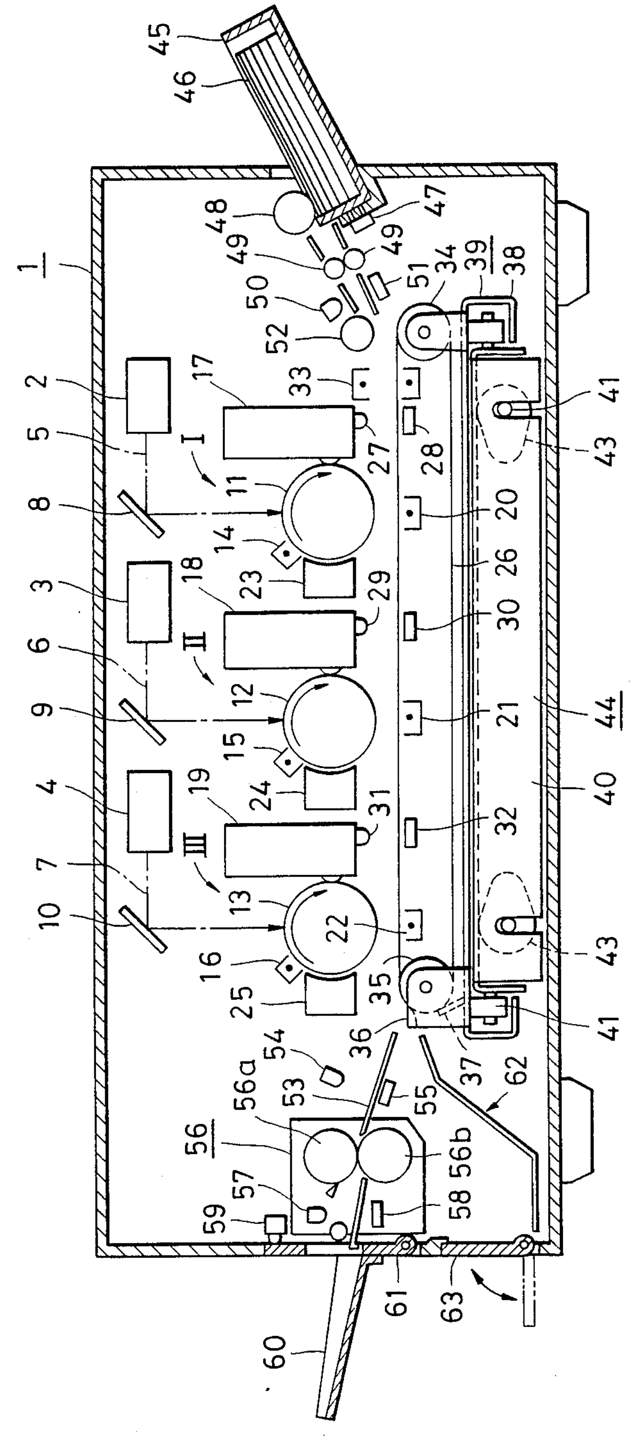
FIG. 3 is a schematic sectional view of the apparatus shown in FIG. 1 with the image receiving member feeding device fixed at the lowermost position.
Figure 5:
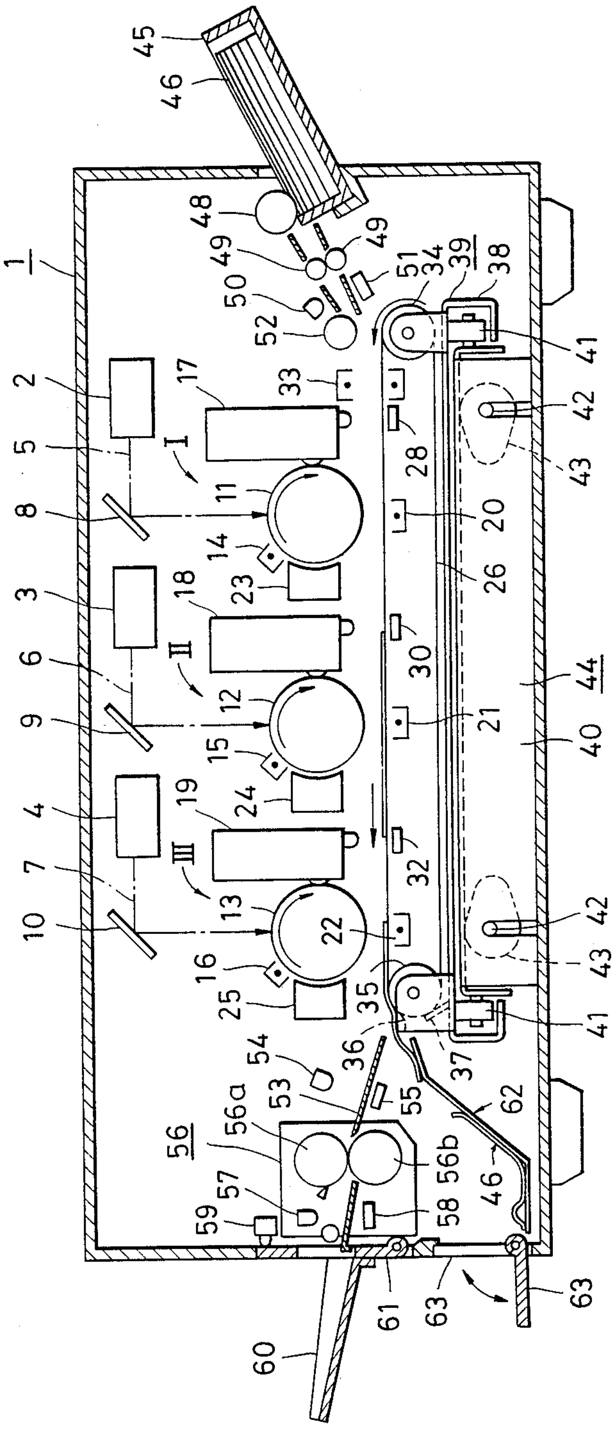
FIG. 5 is a schematic sectional view of of the apparatus shown in FIG. 1, illustrating the feed path of the image receiving member formed when the feeding device is set at the position shown in FIG. 3.

FIG. 3 shows the laser beam printer in a state in which the feeding device 39 has been lowered to the "lowermost" position. As the feeding belt 26 is driven to feed the image receiving member 46, the image receiving member 46 is separated by the separation claw 36 from the feeding belt, and is delivered to the discharge passage 62. The image receiving member 46 thus delivered to the discharge passage 62 can be taken out of the laser beam printer without passing through the fixing device 56, because it is accessible through a space formed after opening the discharge cover 53, as shown in FIG. 5. In this case, when the feeding device 39 is in the lowermost position as shown in FIG. 3, the feeding device 39 constructed as a unit can be pulled out of the laser beam printer 1 along the rollers 41, after opening front doors 64,65 of the laser beam printer 1, as will be seen from FIG. 6. The transfer chargers 20,21,22 also are pulled out together with the feeding belt 26 and other members constituting the feeding device 39.

Figure 6:
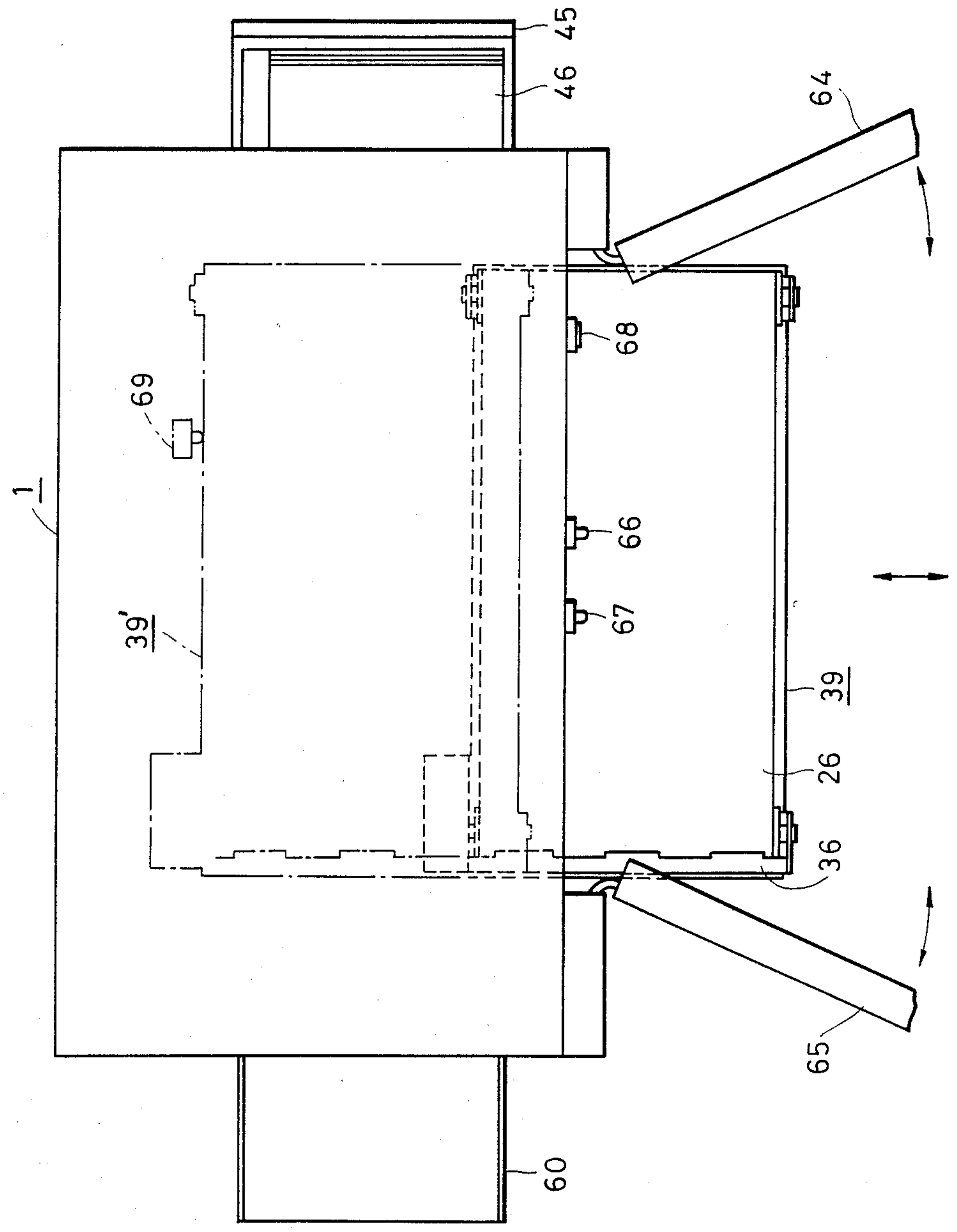
FIG. 6 is a plan view of the laser beam printer of FIG. 4, with the image receiving member feeding device extracted therefrom.

Referring to FIG. 6, when the feeding device 39 is properly set in the laser beam printer, a pin of the position switch 69 is pressed by the feeding device 39. As the feeding device 39 is pulled out as shown in FIG. 6, the pin of the position switch 69 is reset by spring action so that the electric current which flows through the position switch 69 is cut off. The microcomputer, therefore, can detect whether the feeding device 39 is set in the normal position (denoted by 39') within the laser beam printer 1, by examining the state of position switch 69.

The operation of the described laser beam printer, when used together with an image receiving member of a large heat capacity, will be described hereinunder.

In this embodiment, the timing of the sequential operation for forming an image is determined on the basis of the signal from the photo-diode 51. The description therefore will be commenced with an explanation of the method for determining the operation timing on the basis of the signal from the photo-diode 51.

Referring to FIG. 1, when the image receiving member 6 is fed into the laser beam printer 1 by means of the register rollers 49, the light from the lamp 50 cannot reach the photo-diode 51 because the light is interrupted by the image receiving member 46. When the trailing end of the image receiving member 46 has cleared the path of light between the lamp 50 and the photo-diode 51, the photo-diode again receives the light so that the level of the output from the photo-diode 51 is changed.

The distances between the photo-diode 51 and the nips between the respective photosensitive drums 11, 12 and 13 and the feeding belt 26 are known. The feeding speed of the image receiving member 46 also is given. This enables an accurate prediction of when the image receiving member will pass the respective nips between the photosensitive drums, 11,12, 13 and the feeding belt 26, Namely, the time until the trailing end of the image receiving member passes the nip between the photosensitive drum 11 and the feeding belt 26 is determined by dividing the distance B between the nip and the photodiode by the feeding speed of the image receiving member.

The thus predicted times at which the trailing end of the image receiving member passes the nips on the respective photosensitive drums are recorded and the image forming operations are conducted on the basis of the signals from the photo-diode 51.

Referring to FIG. 1, when an image receiving member of a large heat capacity, e.g., a plastic sheet for an overhead projector (OHP) is placed in the cassette 45, the laser beam printer performs the same image forming operation as that for ordinary image receiving member until the trailing end of the plastic sheet leaves the nip on the photosensitive drum 13, unless the feed speed of the fixing device 56 is specifically reduced as compared with the feed speed for the ordinary image receiving member, whereby toner images of three colors are superposed on a plastic sheet.

When a predetermined time has elapsed from the moment at which the trailing end of the plastic sheet has cleared the nip on the photosensitive drum 13, the lifting device 44 operates to lower the feeding device 39 to an intermediate position shown in FIG. 2 and the feeding speed of the feeding device 39 is reduced almost to the same level as the feeding speed of the fixing device 56 which is operating at a reduced speed. Therefore, the difference between the feeding speed of the fixing device 56 and the speed of feed performed by the feeding device is made extremely small, thus eliminating the formation of the loop of the plastic sheet. Therefore, undesirable looping of the image receiving member after passing the nip on the photosensitive drum 13 is avoided, even when the plastic sheet has a large length.

When the trailing end of the plastic sheet brought into the fixing device 56 has passed the photo-diode 55, the feed speed of the feeding belt 26 is increased to the same level as the speed of rotation of the photosensitive drums.

Simultaneously with the recovery of the feed speed of the feeding device 39, the lifting device 44 operates to lift the feeding device 39 so as to fix the latter at a position suitable for the formation of the image.

The described image forming sequence is repeated so that an image is formed on the image receiving member having a large heat capacity.

When the laser printer is used for a uni-color image formation rather than full-color printing, the lifting device 44 operates when the trailing end of the plastic sheet has passed the nip on the photosensitive drum by which the uni-color image was formed, so that the feeding device 39 is lowered to an intermediate position shown in FIG. 2, whereby the image is fixed in good order without causing looping of the image receiving member.

As will be understood from the foregoing description, according to the present invention, the control of the image forming sequence by the microcomputer differs according to the heat capacity of the image receiving member used in the printer. Various known methods are usable for informing the microcomputer of the level of the heat capacity of the image receiving member which is being used. For instance, the operator can select and input information concerning the heat capacity of the image receiving material by means of a change-over switch. It is also possible to provide different image receiving members in different types of cassettes so that the information concerning the heat capacity can automatically be input by the insertion of the cassette. The input of the information also may be conducted by conditions of combination of different types of sensors, e.g., a photosensor which is used when recording is done on a transparent plastic sheet and a contact-type sensor.

Next, a description will be given concerning a method of detecting any failure in the feeding of the image receiving member in the laser beam printer. Basically, the feeding failure detection method is a known method in which occurrence of any feeding failure is determined if no change is observed in the output from a photo-diode further downstream even when a set time has elapsed after completion of an operation, i.e., when the interruption of the light path between a lamp and the corresponding photodiode by the light-receiving member does not occur.

The above-mentioned set time is the time which would be required for the image receiving member to reach the position where the feeding failure detection means is provided under normal operation of the laser beam printer 1. The set times and the set conditions in this embodiment are exemplarily shown below.

Set time a: $T_1 \pm 1$ seconds after output of driving instruction signal for the feed rollers 48.

Set time b: $T_2 \pm 1$ seconds after output of driving instruction signal for the register rollers 49.

Set time c: $T_3 \pm 1$ seconds after a change in the output from each of the photodiodes 28 and 30.

Set time d: $T_4 \pm 1$ seconds after a change in the output from the photo-diode 32.

Set time e: $T_5$ seconds after a change in the output from the photo-diode 55.

Set time f: $T_6 \pm 1$ seconds after a change in the output from the photo-diode 55.

Set time g: The time from the moment at which the image receiving member 46 is brought into the laser beam printer till the moment at which the image receiving member 46 is ejected from the laser beam printer.

Set time h: The time required for the fixing device to feed a pair of sheets of the image receiving member and to fix images thereon.

Set time i: The time required for the image receiving member to travel half the circumferential length of the feeding belt.

The times $T_1$ and $T_6$ used in the definition of the set times can have any suitable lengths in accordance with the operating parameters of the laser beam potential.

In this embodiment, the following sequential operation is conducted in the event of a failure in the feeding of the image receiving member.

A study by the present inventors has proved that the feeding failure in most cases takes place in one of the following areas: (1) in the cassette 45, (2) on the feeding belt 26, (3) on the feeding path 53, and (4) in the fixing device 56.

In the laser beam printer 1 embodying the present invention, different sequences are followed according to which of the above-mentioned four areas the feeding failure has occurred. These different sequences will be described with reference to FIGS. 8 to 11 which are sequence diagrams, as well as with reference to FIG. 12 which is a block diagram of a controller for controlling the sequence.

(1) Sequence Followed When Feeding Failure has occurred in the Cassette 45

A feeding failure in the cassette 45 means that the image receiving member 46 cannot be fed into the laser beam printer 1. This failure can be detected by examining the output from the photo-diode 51. Namely, the microcomputer in the laser beam printer 1 decides that feeding failure is taking place in the cassette 45, when the output level of the photo-diode 51 does not show a change greater than a preset threshold, i.e., when the path of light emitted from the lamp 50 towards the photo-diode 51 is not interrupted by the leading end of the image receiving member 46, after termination of the set time a from the moment at which the feed rollers have started to rotate in accordance with the instructions given by the microcomputer. This decision is conducted in Step 102 of the sequence shown in FIG. 8. A feeding failure/sheet removal sequence 1 (see FIG. 9) is then started.

Figure 7:
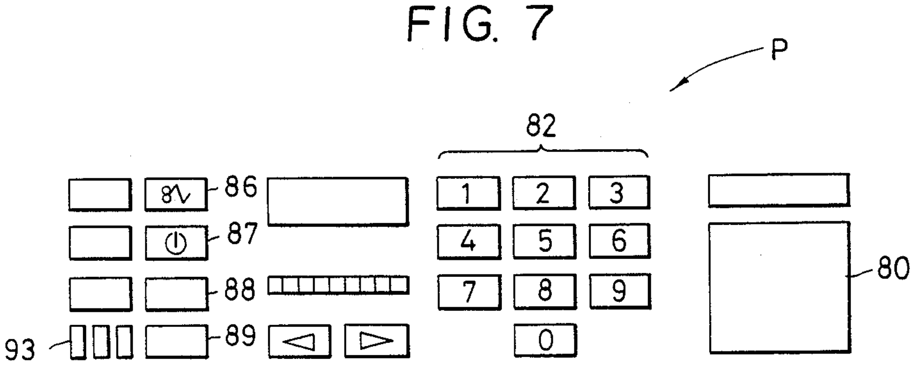
FIG. 7 is a plan view of an operation panel P in the apparatus shown in FIG. 1.

The feeding failure/sheet removal sequence varies depending on whether the image receiving member which has failed to be fed is the one which is fed first after the start of the printing operation or one which follows one or more members which have been fed safely. When the image receiving member failed to be fed is the first one, the answer YES to the question posed in Step 112 is YES. In this case, there is no image receiving member downstream from the area where the feeding failure has occurred. As a result, the microcomputer stops the operation of the laser beam printer 1, and lights up an indicator 86 indicative of the feeding failure on the operation panel P shown in FIG. 7 (Step 113). In FIG. 7, a numeral 80 denotes a start key, while 82 denotes a key pad having ten keys for inputting, for example, the number of prints or copies to be obtained.

Upon recognition of the occurrence of the feeding failure, the operator withdraws the cassette 45 from the laser beam printer 1 (Step 114) and, after removing the image receiving member which failed to be fed, inserts the cassette 45 again. As a result, the cassette detection switch 47 is again actuated and becomes conductive (Step 115). In response to a signal from the cassette detection switch 47, the microcomputer extinguishes the feeding failure indicator 86 (Step 116) so as to finish the feeding failure/sheet removal sequence 1, thus enabling the laser beam printer 1 to start again.

In the event that a feeding failure has taken place in the course of continuous operations for forming images on a plurality of consecutive image receiving members, the answer to the question posed in Step 112 is NO. In this case, the microcomputer operates to stop the operation of the feed rollers 48 and the register rollers 49, while allowing the laser beam printer 1 to continue the image forming operation on the image receiving member or members which are being safely fed by the feeding belt 26 (Step 117).

Then, the microcomputer controls the laser beam printer such that the image forming operations are inhibited in the successive image forming stations, from the upstream one to the downstream one, in accordance with the feed of the image receiving member which is immediately prior to the image receiving member failed to be fed. This control effectively prevents the feeding belt 26 from being contaminated by the toner image.

To explain in more detail, after the completion of the formation of a toner image on the image receiving member which is immediately prior to the image receiving member that failed to be fed, the formation of the next image on the next is inhibited, e.g., by moving the developing device away from the surface of the photosensitive drum that has just finished the image formation, or by stopping the illumination of the laser beam onto the photosensitive drum. This operation is repeatedly conducted for the successive photosensitive drums or stations and, when the formation of yellow toner image at station III has been completed, the image formation on all the photosensitive drums is completed.

After termination of a predetermined set time g from the detection of the feeding failure, the microcomputer operates to stop the image forming operation of the laser beam printer 1 and lights up the feeding failure indicator 86 in Step 118. The process then returns to the sequence of Step 114 shown in FIG. 9. Then, the same sequence is followed as the previously described sequence which was employed in the event of the failure of feed of the first image receiving member after the commencement of the image forming operation.

Before the termination of the set time g after the detection of the feeding failure, the image receiving member which was fed immediately prior to the member that failed to be fed, with the color toner images formed thereon, is ejected by the fixing device 56.

(2) Sequence Followed When Feeding Failure has Occurred on Feeding Belt 26

This feeding failure can be classified into two types. The first type occurs when an image receiving member 46 fed by the register rollers 49 has jammed under the pressing roller 52 so as not to be electrostatically attracted by the feeding belt. The second type of failure occurs when the electrostatic force exerted by the surface of the photosensitive drum 11, 12 or 13 exceeds the electrostatic attracting force of the surface of the feeding belt 26. In this case, the image receiving member is electrostatically attracted by the surface of the photosensitive drum and is brought to the position where the cleaner 23, 24 or 25 is mounted so as to jam between the cleaner and the photosensitive drum.

The failure occurring under the pressing roller 52 is detected by the microcomputer when the light path between the lamp 27 and the photo-diode 28 is not interrupted by the image receiving member, i.e., when the output of the photo-diode 28 is not changed by amount exceeding a predetermined threshold, within the aforementioned set time f from the operation of the register rollers 49 after the light path to the photo-diode 51 from the lamp 50 is interrupted by the image receiving member 46. The jamming of the image receiving member between the cleaner 23 and the photosensitive drum 11 is detected if the level of the output signal from the photo-diode 30 does not change after a predetermined time from the aforementioned set time c after a change in the level of the signal from the photo-diode 28. Jamming between other cleaners 24, 25 and the associated photosensitive drums 12, 13 can be done in the same manner as that described above by means of the photo-diodes 30, 32 and 55, on the basis of the set times c and d.

Figure 10:
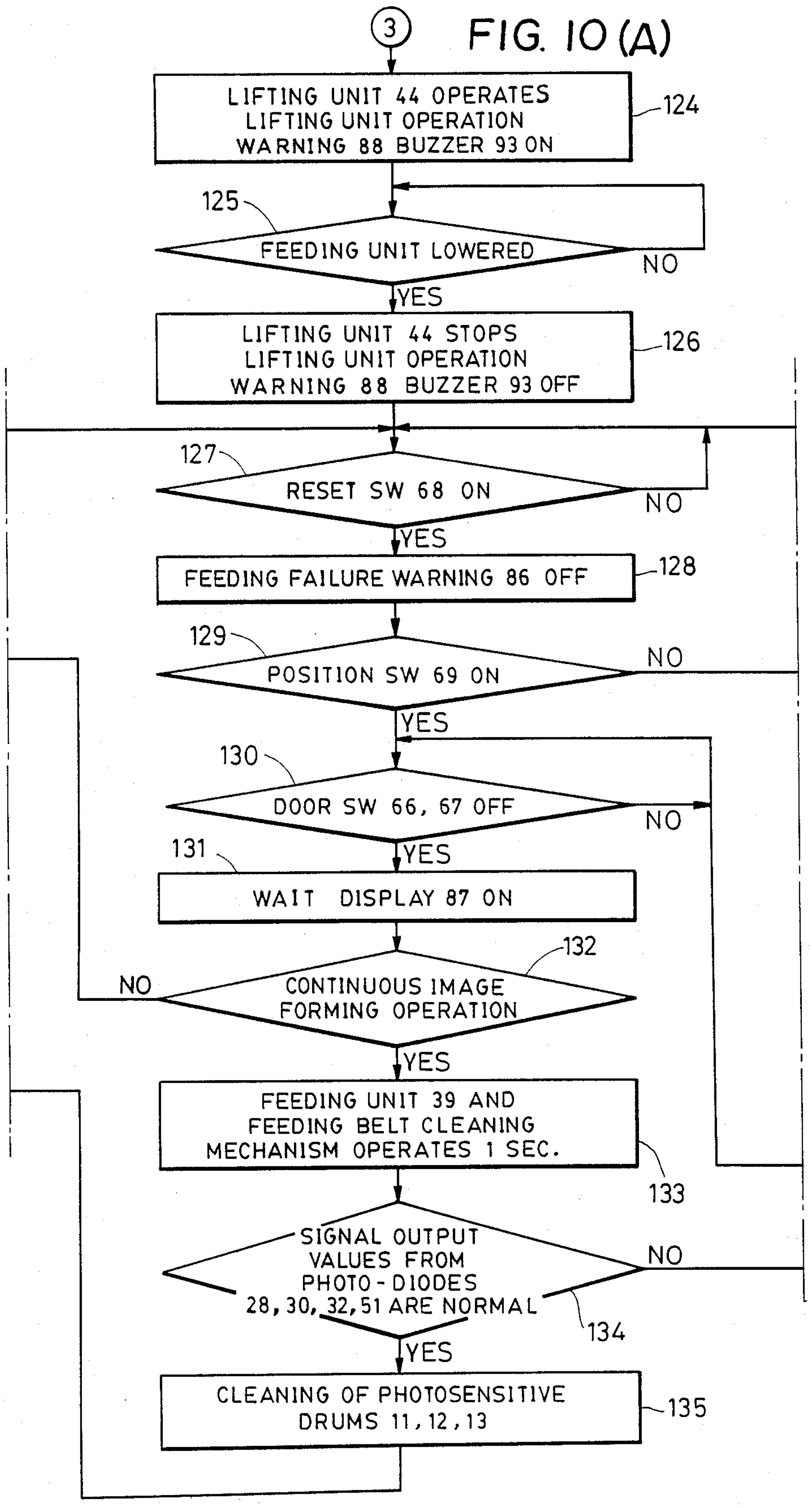
Figure 10:
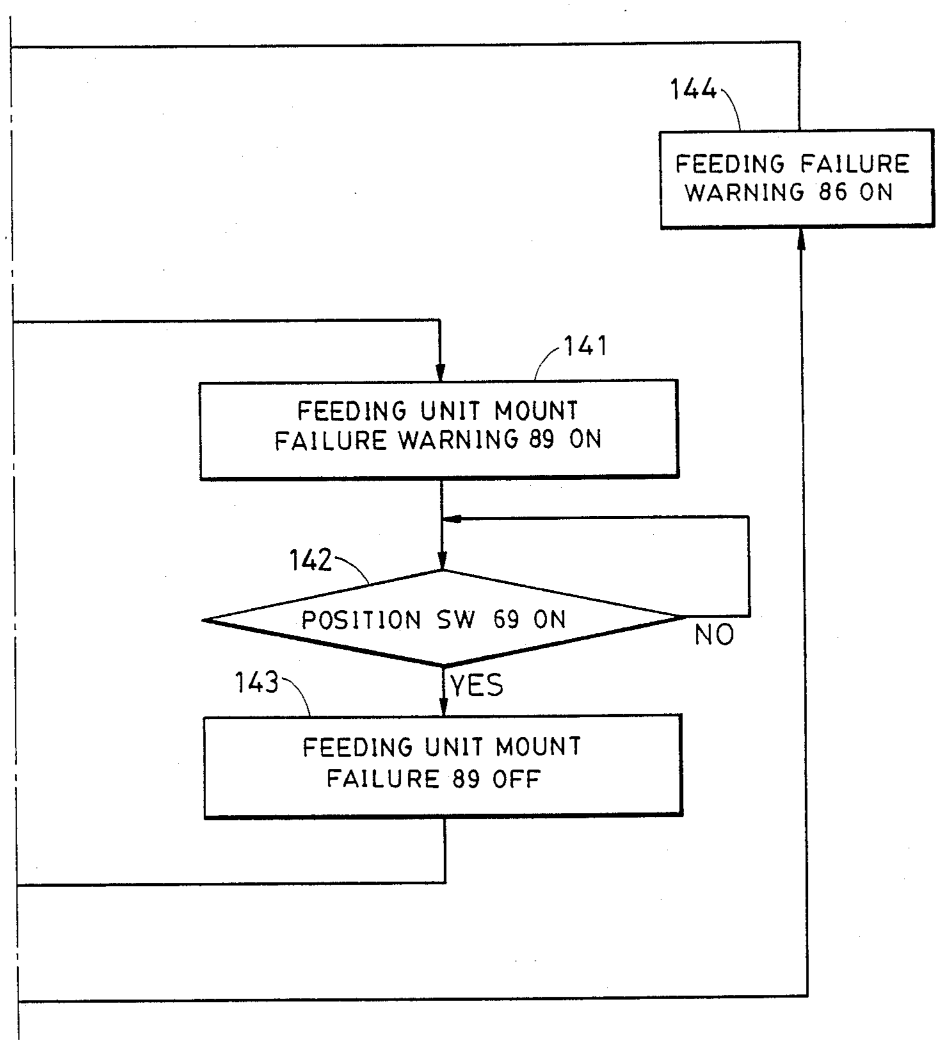
Figure 10:
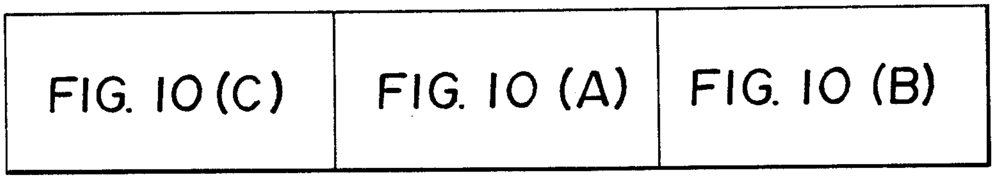

The feeding failure/sheet removal sequence which is followed in the event of a feeding failure on the feeding belt 26 will be described hereinunder with reference to FIGS. 8 and 10.

Figure 8:
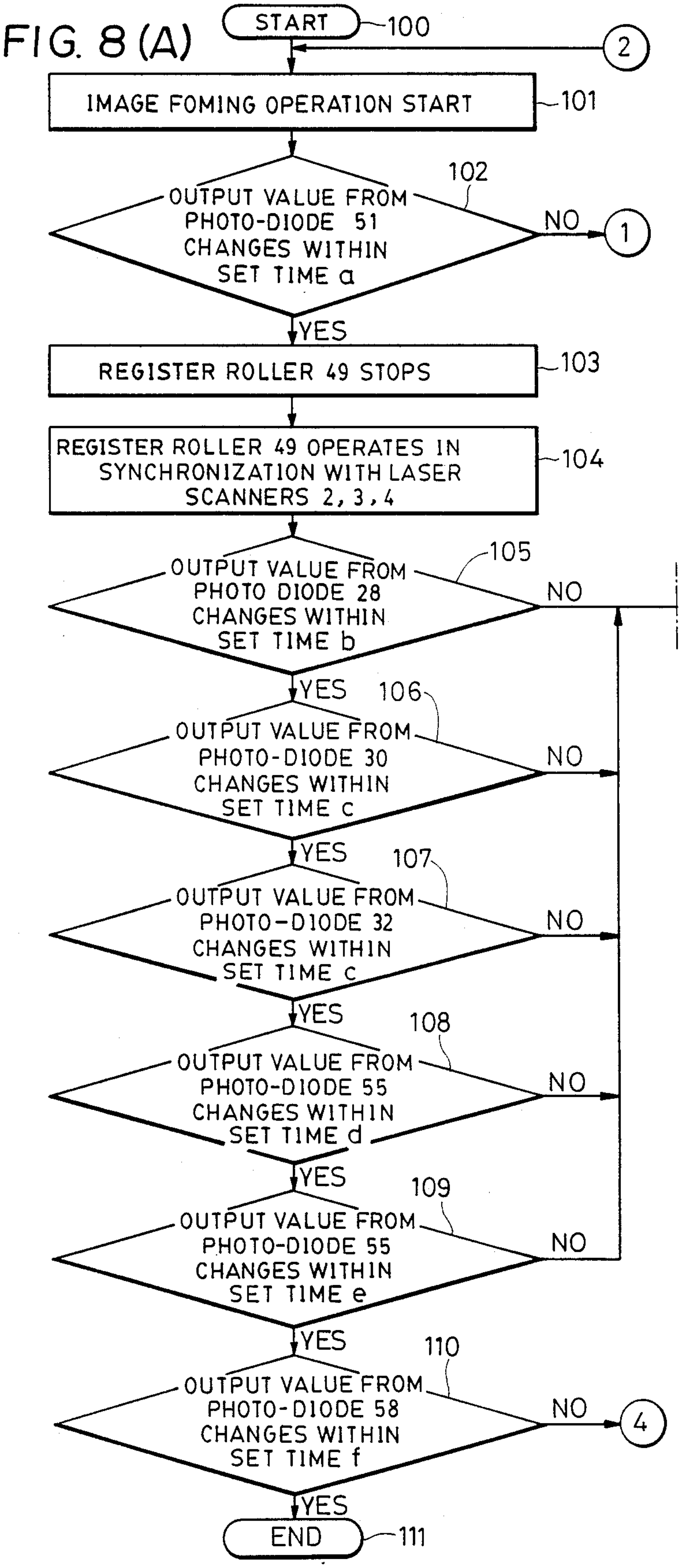
FIGS. 8 to 11 are flow charts illustrating the sequence of operation of the laser beam printer shown in FIG. 1.
Figure 8:
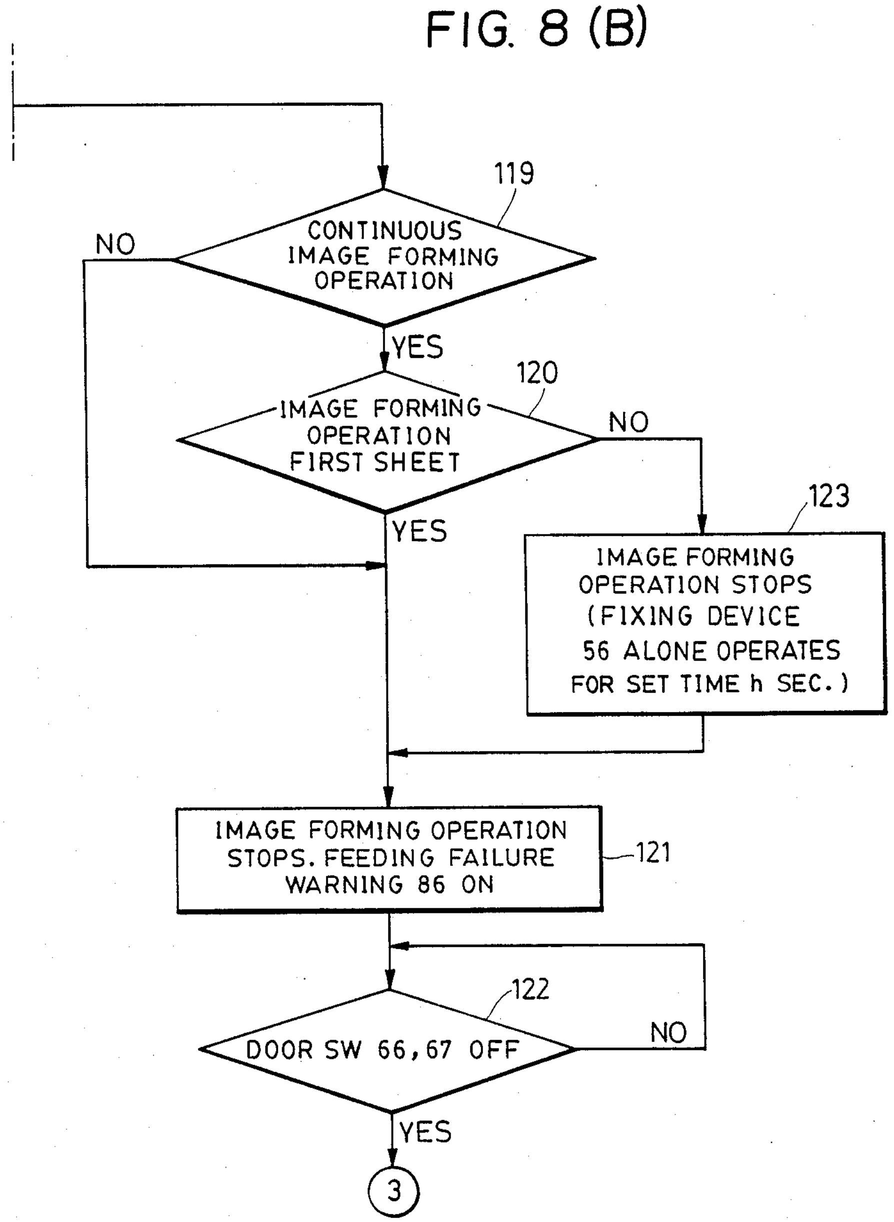
Figure 9:
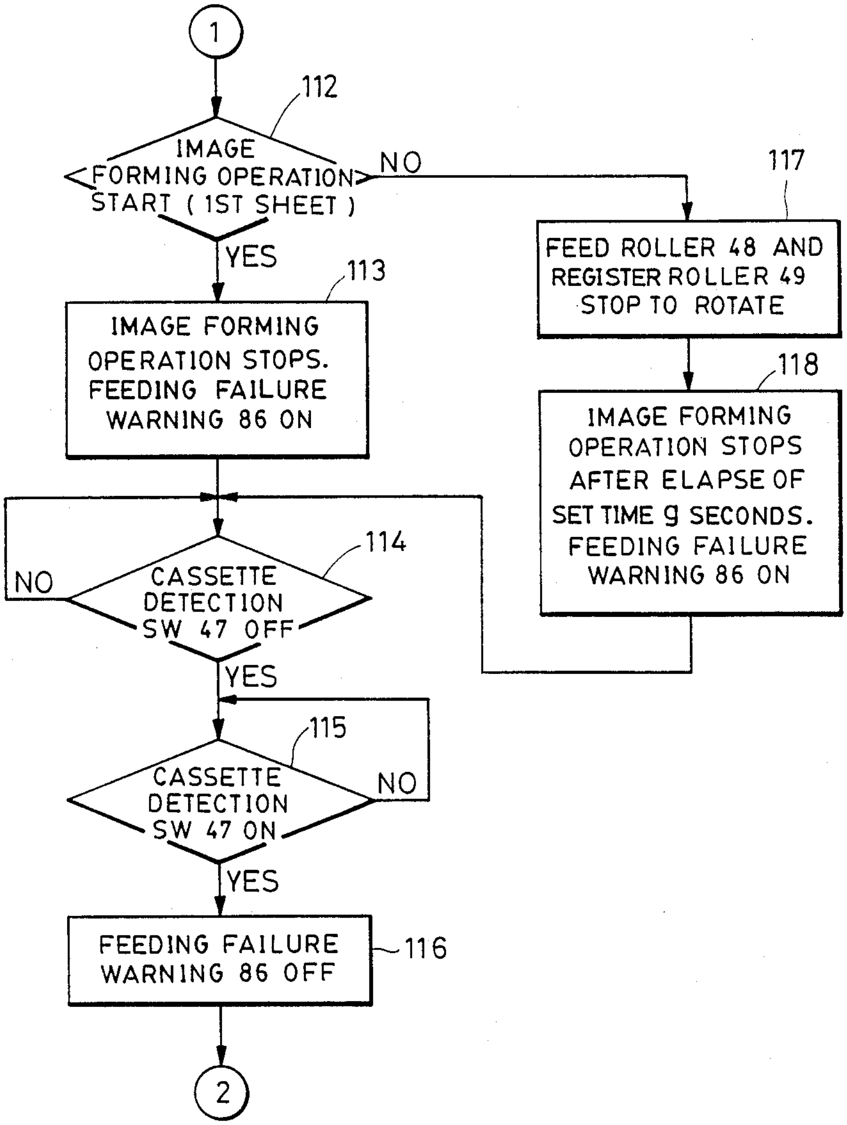

The occurrence of this failure is detected in one of Steps 105, 106, 107 and 108 in the sequence of FIG. 8. If the failure has occurred when only a single image receiving member is to be used, e.g., when only one image is to be obtained, or when the failure has occurred with the first one of a plurality of consecutive image receiving members, Step 119 or Step 120 is followed so that the microcomputer stops the image forming operation without delay, while lighting up the feeding failure indicator 86 on the control panel P (FIG. 7) of the laser beam printer 1 (Step 121). On the other hand, when the failure has occurred with an intermediate one of a plurality of consecutive image receiving members which are to fed successively, i.e., when the answer is NO to the question posed in Step 120, the sequence of Step 123 is commenced so that the operation of all the devices in the laser beam printer 1 except the fixing device 56 is stopped, immediately after the detection of the feeding failure.

After the detection of the feeding failure, the fixing device 56 operates for the period of set time h and executes the fixing operation only on the image receiving member which has undergone the image forming processes with all color toner images, and ejects the image receiving member with the image fixed thereon to the tray 60 (Step 123). After termination of the time h, the entire laser beam printer stops operating and the feeding failure indicator 86 on the control panel P of the laser beam printer 1 is illustrated (Step 121).

Referring to FIG. 6, the operator opens a right front door 64 and a left front door 65 to access the image receiving member that failed to be fed, for the purpose of removing this image receiving member. As a result, the pins and electrical contacts in the respective door switches 66 and 67 are reset by the spring force in these switches so as to open the signal transmission lines to the microcomputer (Step 122). Consequently, the feeding failure/sheet removal sequence shown in FIG. 10 is started.

More specifically, when the door switches 66 and 67 are turned opened, the microcomputer operates to activate the lifting device 44 to lower feeding device 39 automatically (Step 125) to the position shown in FIG. 3. At the same time, a lifting device operation warning 88 on the control panel P of the laser beam printer 1 lights up and a buzzer 93 goes off (Step 124) to inform the operator of the operation of the lifting device 44. When the feeding device 39 reaches the position shown in FIG. 3, the lifting device 44 stops operating and the lifting device operation warning 88 and the buzzer 93 are extinguished.

As a result of the operation described above, a space is formed between the photosensitive drums 11,12 and 13 and the feeding belt 26, so that it becomes possible to withdraw the feeding device 39 out of the laser beam printer 1 on rollers 41, thus enabling the removal of the image receiving member. The feeding failure indicator 86 is extinguished when a reset switch 68 is pressed (Steps 127, 128). When the operator draws the feeding device 39 forwardly to remove the image receiving member that failed to be fed, position switch 69 is turned off to interrupt a signal current so that a feeding device mounting failure warning 89 lights up on the control panel P of the laser beam printer (Step 141).

After removing the image receiving member which has failed to be fed, the operator re-inserts the feeding device 39 into the laser beam printer 1 and closes the front doors, so that the feeding device mounting failure warning 89 on the control panel P is extinguished and, instead, a wait indication 87 on control panel P is turned on to indicate a preparatory state P (Steps 130, 131, 142, 143).

While displaying the wait indication 87, the microcomputer judges whether the failed image forming operation is for a single print or the same has occurred in the course of continuous image forming operation on successive image receiving members (Step 132). If the judgment in Step 132 has proved that the failure has taken place during the continuous image forming operation, the image receiving members which are undergoing the image forming operations by the respective photosensitive drums 11,12 and 13, except the image receiving member which has failed to be fed, are attracted onto the surface of the feeding belt 26 at a predetermined interval.

Therefore, when the condition of Step 132 is met, the feeding device 39 is made to operate alone for the set time i to allow the feeding belt 26 to run at least half the circumferential length of the belt, so that the image receiving members attracted to the surface of the feeding belt are separated by the separation claw 36 so as to be fed into a discharge passage 62. Meanwhile, the surface of the portion of the feeding belt 26 which has delivered the image receiving member to the discharge passage 62 is cleaned and charge-eliminated by the conductive blade 37. When a cleaner/charge eliminator is of the type which requires electrical power, e.g., a rotary brush or electrostatic attractor, such a cleaner/-charge eliminator is made to operate for the set time i seconds in synchronization with the operation of the feeding device 39.

After the completion of the operation of the feeding device 39 for the period i seconds, the lamps 27,29, 31 and 50 are lit on so that the presence or absence of the image receiving member the feeding belt 26 is judged on the basis of the output signals from the photo-diodes 28, 30, 32 and 51 (Step 134). If the output from at least one of the photo-diodes 28, 30, 32 and 51 has failed to meet a reference value, i.e., when the light path from at least one of the lamps 27, 29,31 and 50 has been interrupted by the image receiving member which could not be fed into the discharge passage 62, the feeding failure warning 86 on the control panel P is again turned on (Step 144) and the process returns to Step 127, thus requesting the operator to remove the image receiving member from the feeding belt 26. If the signal outputs from all the photo-diodes 28, 30, 32 and 51 are normal, i.e., when the answer to the question posed in Step 134 is YES, the microcomputer operates to effect at least one full rotation of each photosensitive drum 11, 12, 13 so as to enable the cleaners 23, 24, 25 to clean the surfaces of the respective photosensitive drums 11,12,13 (Step 135). After the completion of the cleaning of the photosensitive drums 11,12, 13, the lifting device 44 operates again to rotate the cams 43 so as to raise the feeding device 39 again to the position of FIG. 1 to enable the image formation (Step 136). Subsequently, in relation to the operation of the lifting device 44, the lifting device operation warning 88 on the control panel P lights up and the buzzer 93 goes off to provide a warning (Step 136).

The lifting device 44 stops operating when the feeding device 39 has been raised to a position where the formation of the image is possible. The buzzer 93, the lifting device operation warning 88 and the wait indication 87 also are stopped in sequence so that the laser beam printer 1 becomes ready for the printing operation, whereby the feeding failure/sheet removal sequence 2 shown in FIG. 10 is completed (Steps 139, 140).

Next, a description will be given for the case where the question posed in Step 132 indicates that the feeding failure has occurred when only one copy is to be obtained from the laser beam printer.

When the feeding failure has occurred under such a condition, only the image receiving member which has failed to be fed is contained within the laser beam printer 1. When the image receiving member is removed by the operator in the sequence of Steps 119 to 132, therefore, no image receiving member remains in the feed path of the image receiving member.

When the process proceeds from Step 132 to Step 145, land a judgment is conducted as to whether any image receiving member exists on the feeding belt 26, on the basis of the levels of the signals output from the respective photo-didoes 28, 30, 32 and 51. In Step 145, if at least one of the photo-diodes 28, 30, 32 and 51 has failed to provide an output of the set level, the feeding failure warning 86 on the control panel P is lit on (Step 147) and the process returns to the sequence of Step 127 to request the operator to remove the image receiving member remaining on the path of feed of the image receiving member. When outputs of the set level have been obtained from all the photo-diodes 28,30, 32 and 51, the photosensitive drums 11,12,13 and the feeding belt 26 are cleaned. To explain in more detail, the photosensitive drums 11,12,13 make at least one full rotation so as to be cleaned by the associated cleaners 23,24,25. Simultaneously with the cleaning of the photosensitive drums 11, 12, 13, the feeding device 39 operates for set time i seconds and drives the feeding belt 26 over at least half the length thereof, whereby contaminating toners of different colors remaining on the surface of the feeding belt 26 are removed and the charges are eliminated from the same, as the belt surface passes by the conductive blade 37.

When a belt cleaning mechanism which requires electric power, e.g., a rotary brush or an electrostatic attractor, is used in place of the conductive blade 37, such a mechanism is made to operate for set time i seconds in synchronization with the operation of the feeding device 39.

When the cleaning of the photosensitive drums 11,12,13 is finished in Step 146, the process proceeds to Step 136 and Steps are followed down to Step 146 so that the same operation as the above-described operation is performed when the feeding failure has occurred in the course of the continuous image forming operation, whereby the feeding failure/sheet removal sequence (2) is completed.

(3) Sequence Followed When Feeding Failure has Occurred Between Feeding Belt 26 and Fixing Device 56

The feeding failure of this type usually occurs in the portion where the separation claw 36 is placed. To explain in more detail, the trouble takes place since the image receiving member 46 which is electrostatically attracted by the surface of the feeding belt 26 is caught between the separation claw 36 and the feeding belt 26, without being separated by the claw 36. Also the image receiving member may be stalled in the path 53 of feed, without being fed into the fixing device 56.

Feeding failures taking place in the separation claw 36 are detected by examining the level of the output from the photodiode 55. The microcomputer decides that the feeding failure is taking place around the separation claw 36, when no change in the level of the output from the photo-diode 55 is found after termination of set time d seconds from a change in the level of the output from the photo-diode 55. On the other hand, a feeding failure on the feeding path 53 is detected when level the output signal from the photo-diode 55 has not recovered after elapse of the set time e seconds from the preceding change in the level of the output from the same photo-diode 55.

Upon detection of the feeding failure, the microcomputer starts the feeding failure/sheet removal sequence 2 as is the case of when the feeding failure has occurred on the feeding belt 26 described before. Namely, when one of the conditions described in Step 108 or 109 is not met, the process proceeds to Step 119 which tests if the present printing mode is the continuous printing mode for printing images on a plurality of successive image receiving members. When the instant printing mode is the continuous mode, the process proceeds to Step 120 which tests whether the image receiving member that failed to be fed is the first one or an intermediate one of the plurality of successive image receiving members. Different sequences are selected according to the result of the test in Step 120, and the image forming operation of the laser beam printer 1 is stopped in Step 121. After the image forming operation is stopped, the operator opens the right and left front doors 64 and 65 in Step 122, and the microcomputer commences the feeding failure/sheet removal sequence shown in FIG. 10.

(4) Sequence Followed When Feeding Failure Has Occurred in Fixing Device 56

Feeding failure in the fixing device 56 is mainly attributable to jamming of the image receiving member during discharging. This type of feeding failure can be detected by the photo-diode 58. The microcomputer judges that this type of feeding failure is taking place when no change is caused in the level of the output from the photo-diode 58 after termination of the set time f from a change in the level of the output from the photo-diode 55 (Step 110 in FIG. 8). When the feeding failure is detected in Step 110, the microcomputer activates the "feeding failure sequence 4" of FIG. 11 so as to stop the image forming operation of the laser beam printer 1 and lights up the feeding failure warning 86 on the control panel (Step 147). When the operator opens the fixing cover 61 for the purpose of removing the image receiving member, the fixing cover switch 59 is turned off so as to cut off the electric current flowing therethrough (Step 148). As the operator closes the fixing cover 61 after the removal of the jammed image receiving member, the fixing cover switch 59 is turned on again (Step 149). Upon confirming the turning on of the fixing cover switch 59, the microcomputer confirms whether the level of the output from the photo-diode 58 is normal or not (Step 150). When the judgment in Step 150 has proved that the normal output level is obtained from the photo-diode 58, the process proceeds to Step 151 in which the feeding failure warning 86 is turned off and, instead, the wait indication 87 is lit on (Step 151).

In Step 152, a temperature control circuit for the fixing device 56 is made to operate until the heat rollers in the fixing device 56 are heated up to a temperature suitable for fixing of the image. When the fixing device 56 becomes operational, the microcomputer operates to enable the photosensitive drums 11,12, 13, feeding device 39 and the fixing device 56 to operate for the set time i, so that the image which is being formed on the image receiving member attracted on the feeding belt 26 is fixed and the image receiving member is ejected onto the tray 60 (Step 153). Meanwhile, the surfaces of the photosensitive drums 11,12, 13 and the feeding belt 26 are cleaned by the cleaners 23,24,25 and the conductive blade 37, respectively. After the completion of the operation for the set time i, the microcomputer judges whether the levels of the outputs from the photo-diodes 28,30,32,51 and 55 are normal (Step 154). When these signal levels are normal, the microcomputer turns off the wait indication 87 on the control panel P, thus completing the feeding failure sequence shown in FIG. 11. If there is any abnormal output level among the outputs from the photo-diodes 28, 30, 32,51 and 55, the process proceeds from Step 154 to Step 124 in the feeding failure sequence 2 in FIG. 10, so that the sequence the same as that described before in connection with FIG. 10 is executed.

Although the detection of the feeding failure in the described embodiment relies upon optical-type sensors, this is only illustrative and the detection of the feeding failure maybe conducted by various other types of sensors such as microswitches, sensors making use of electrostatic capacitances, and so on. The cleaning of the feeding belt also can be effected by various means other than the blade, such as a cleaner which makes use of electrostatic attracting force, a cleaner which makes use of a burst of air, and a cleaner which makes use of stickiness.

The lifting device for lifting and lowering the feeding device also may be constituted by various types of mechanisms such as a pantograph or a similar parallel ink mechanism, rack-and-pinion type mechanism, lifting gears which make use of wires and pulleys, and so forth, in place of the cam-type mechanism employed in the described embodiment. Thus, the lifting device used in the invention can have a wide variety.

In the described embodiment, the retraction of the feeding device from the photosensitive drums is effected by moving the feeding device vertically. This, however, is only illustrative and the arrangement is such that the feeding device is pivotally supported at a portion thereof so as to be able to rotate thereabout away from the surfaces of the photosensitive drums, as shown in FIGS. 13 and 14.

Figure 13:
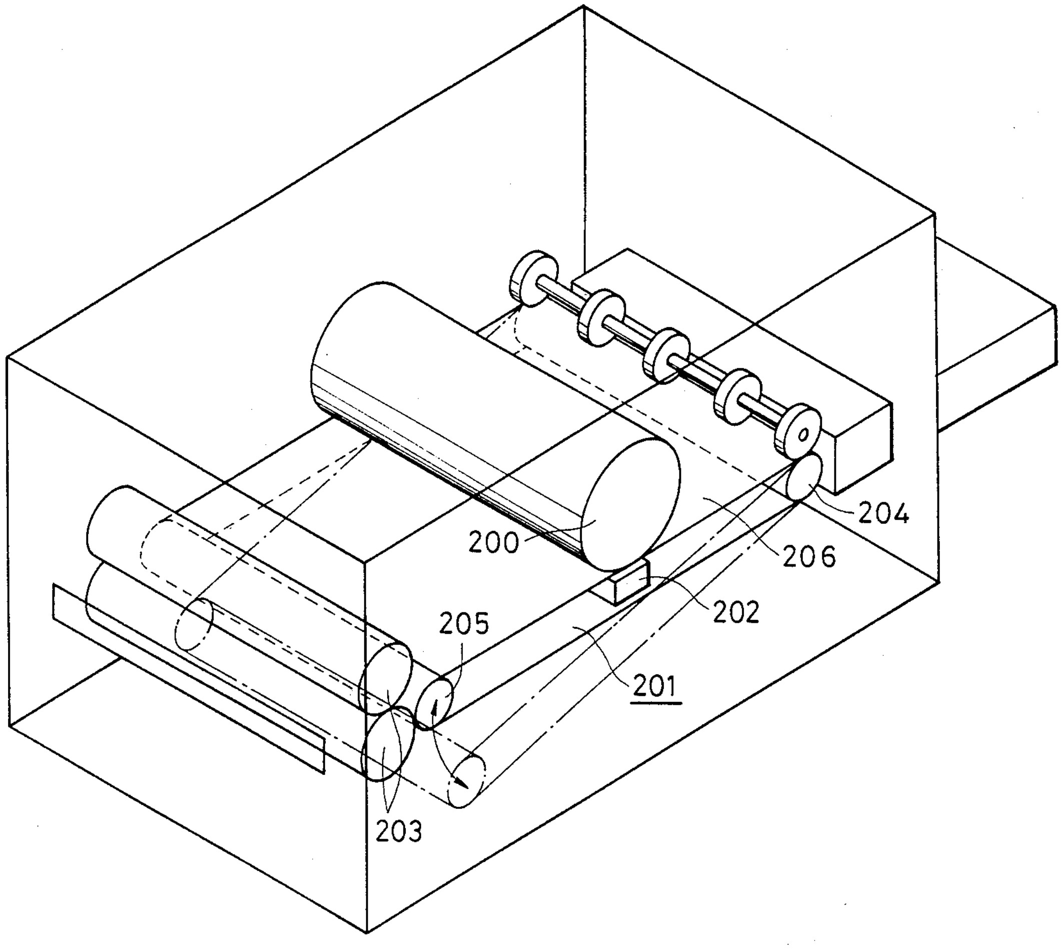
FIGS. 13 and 14 are perspective views of different examples of lifting devices for retracting the image receiving member feeding device from the image forming medium.
Figure 14:
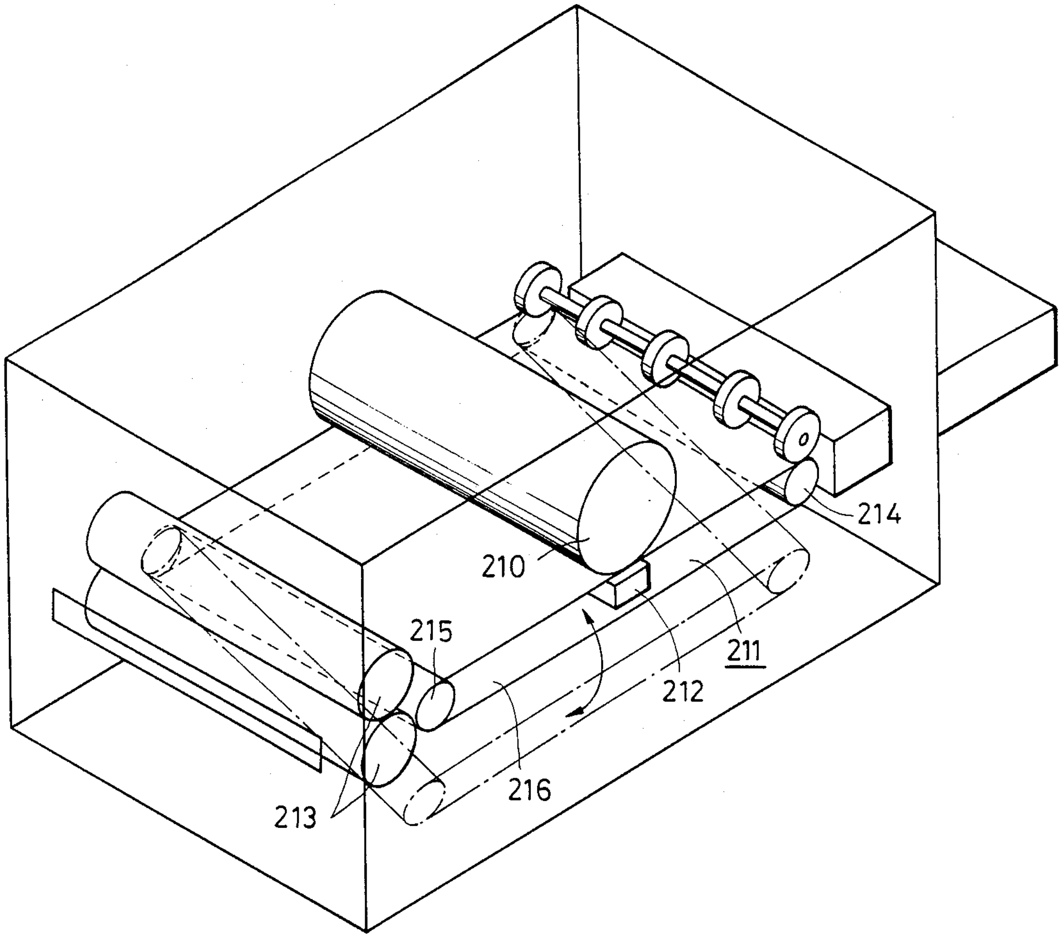

To explain in more detail, in the arrangement shown in FIG. 13, the axis of the rotational movement of the feeding device is on the center of the feeding roller 204 so that the feeding belt 206 can move away from the photosensitive drum 200 as a feeding roller 205 adjacent he fixing rollers 203 is lowered. In the arrangement shown in FIG. 14 in which similar clearance numerals are used to denote similar elements, the axis of rotation of the feeding device is disposed on the inner side of the feeding rollers 214, 215 in the printer so that the front side of the feeding device 211 can be lowered, whereby the feeding belt 216 is retracted from the photosensitive member 210. FIGS. 13 and 14 show only one photosensitive member 200, 210 with the other photosensitive members omitted from these Figures for the purpose of clarification.

In the described embodiment, the feeding belt is held in contact with the photosensitive drums when the laser beam printer is not operating, i.e., when the same is in the stand-by condition, as will be seen from FIG. 1.

This arrangement suffers from a disadvantage in that, when the image forming operation is started, a difference of feed speed is caused between the surfaces of the photosensitive drums and the feeding belt, so that the contacting surfaces are worn due to slippage therebetween. In addition, if the surfaces of the photosensitive drums and the surface of the feeding belt are held in contact for a long period of time, ventilation is restricted at the contacting regions so that the air flow for removing ozone generated in the printer is impaired, with the result that the quality of the image is degraded due to the deposition of ozone onto the contacting surfaces of the photosensitive drums and the feeding belt.

In order to obviate these problems, the apparatus of the present invention may be designed such that the feeding device is slightly spaced from the surfaces of the photosensitive drums when the apparatus is in the stand-by condition.

The distance between the surfaces of the photosensitive drums and the feeding belt should be made as small as possible but large enough to avoid sliding contact between these surfaces. Such a small distance minimizes the time required for the feeding device to be moved to the operating position of FIG. 1 and, hence, does not cause any substantial delay in the image forming operation. The stationing of the feeding device away from the surfaces of the photosensitive drums may be employed also in other inoperative states of the apparatus, e.g., when the power supply to the apparatus has been turned off or during warming up of the apparatus.

When such a stationing the feeding device away from the surfaces of the photosensitive drums, is employed, it is advisable that feeding device is moved to the operative position of FIG. 1 after confirming that the respective driving motors have reached predetermined speeds after the start-up, or when elapse of a predetermined time long enough to stabilize the motor operation is confirmed through suitable timer means. This reduces wear of the surfaces of the photosensitive drums and the feeding belts. It is also preferred that the respective motors be stopped after the movement of the driving device from the operative position to the position slightly spaced therefrom. With this arrangement, it is possible to avoid wear of the surfaces of the photosensitive drums and the feeding belt due to relative movement which may otherwise be caused therebetween by the difference in the inertia of the driven members when the motors are stopped.

It is also to be understood that the present invention can be applied to an image forming apparatus which employs only one image forming medium or to an image forming apparatus which employs different methods for forming latent image on the image forming medium, although a color image forming apparatus having a plurality of image forming stations has been described specifically.

What is claimed is:

1. An image forming apparatus comprising:
- image forming means including movable image carrying means for forming an image corresponding to image information on said image carrying means;
- transfer means for transferring the image carried by said image carrying means to an image receiving member;
- feeding means defining a closed path for feeding said image receiving member to a position for the transfer of the image from said image carrying means;
- moving means for moving said feeding means between a first position where said feeding means is operable with said image carrying means and a second position where said feeding means is not operable with said image carrying means;
- cleaning means for cleaning said feeding means; and
- control means for operating said feeding means so that said feeding means is cleaned by said cleaning means when said feeding means is in said second position.

2. An image forming apparatus according to claim 1,wherein said image forming means includes second cleaning means for cleaning said image carrying means, said image carrying means also being cleaned when said feeding means is cleaned.

3. An image forming apparatus according to claim 1, wherein said feeding means is moved from said second position to a position different from said first and second position, by said moving means, after being cleaned by said cleaning means.

4. An image forming apparatus according to claim 1, wherein said first position is a position where said image carrying means and said feeding means are contactable with each other.

5. An image forming apparatus according to claim 1, further comprising detection means for detecting a feeding failure of said image receiving member in the feed path of said image receiving member, said feeding means being moved to said second position in response to the detection by said detection means.

6. An image forming apparatus according to claim 5, wherein during a stand-by state of said image forming apparatus, said image carrying means and said transfer means are maintained in an operable state, and said feeding means is maintained in a stand-by state.

7. An image forming apparatus according to claim 1, wherein said image carrying means includes a plurality of image carrying members and said image forming means includes plural members associated with said image carrying members so as to form images of different colors on said image carrying members, and wherein said transfer means includes plural members associated with said image carrying members, the images of different colors being transferred successively to the same image receiving member in a superposed manner.

8. An image forming apparatus according to claim 7, wherein said feeding means is common to said plurality of image carrying members.

9. An image forming apparatus according to claim 8, wherein said feeding means is a belt-like means.

10. An image forming apparatus according to claim 7, wherein said transfer means is movable by said moving means together with said feeding means.

11. An image forming apparatus according to claim 1, wherein said transfer means is movable by said moving means together with said feeding means.

12. An image forming apparatus according to claim 1 or 7, wherein said image carrying means includes an electrophotographic photosensitive member and said image forming means includes a laser beam scanner capable of delivering light information corresponding to image information to said electrophotographic photosensitive member.

13. An image forming apparatus comprising:
- image forming means including movable image carrying means for forming an image corresponding to image information on said image carrying means;
- transfer means for transferring the image carried by said image carrying means to an image receiving member;
- feeding means defining a closed path for feeding said image receiving member to a position for the transfer of the image from said image carrying means;
- moving means for moving said feeding means between a first position where said feeding means is operable with said image carrying means and a second position where said feeding means is not operable with said image carrying means; and supporting means for supporting said feeding means so that said feeding means can be withdrawn from said image forming apparatus when said feeding means is in said second position.

14. An image forming apparatus according to claim 13, further comprising detection means for detecting a feeding failure of said image receiving member in the feed path of said image receiving member, said feeding means being moved to said second position in response to the detection by said detection means.

15. An image forming apparatus according to claim 13, wherein said image carrying means includes a plurality of image carrying members and said image forming means includes plural members associated with said image carrying members so as to form images of different colors on said image carrying members, and wherein said transfer means includes plural members associated with said image carrying members, the images of different colors being transferred successively to the same image receiving member in a superposed manner.

16. An image forming apparatus according to claim 15, wherein said transfer means is movable by said moving means together with said feeding means and can be withdrawn together with said feeding means.

17. An image forming apparatus according to claim 13, wherein said feeding means is common to said plurality of image carrying members.

18. An image forming apparatus according to claim 13, wherein said feeding means is a belt-like means.

19. An image forming apparatus according to claim 13, wherein said transfer means is movable by said moving means together with said feeding means and can be withdrawn together with said feeding means.

20. An image forming apparatus according to claim 13 or 15, wherein said image carrying means includes an electrophotographic photosensitive member and said image forming means includes a laser beam scanner capable of delivering light information corresponding to image information to said electrophotographic photosensitive member.

21. An image forming apparatus comprising:

image forming means including movable image carrying means for forming an image corresponding to image information on said image carrying means;

transfer means for transferring the image carried by said image carrying means to an image receiving member;

feeding means defining a closed path for feeding said image receiving member to a position for the transfer of the image from said image carrying means; and moving means for moving said feeding means to one of a first position where said feeding means is operable with said image carrying means, a second position where said feeding means is retracted from said first position, and a third position where said feeding means is further retracted from said second position.

22. An image forming apparatus according to claim 21, wherein during a stand-by state of said image forming apparatus, said feeding means is set in said second position.

23. An image forming apparatus according to claim 21 or 22, further comprising detection means for detecting a feeding failure of said image receiving member in the feed path of said image receiving member, said feeding means being moved to said third position in response to the detection by said detection means.

24. An image forming apparatus according to claim 21, further comprising:

detection means for detecting a characteristic of said image receiving member; and control means operable in response to said detection means to activate said moving means to move said feeding means from said first position to said second position.

25. An image forming apparatus according to claim 24, wherein the movement of said feeding means from said first position to said second position is effected when the characteristic detected by said detecting means indicates that said image receiving member has a large heat capacity.

26. An image forming apparatus according to claim 21, wherein said first position is a position where said image carrying means and said feeding means contact each other.

27. An image forming apparatus according to claim 25, wherein said image receiving member is a member made of plastic.

28. An image forming apparatus according to claim 21, wherein said image carrying means includes a plurality of image carrying members and said image forming means includes plural members associated with said image carrying members so as to form images of different colors on said image carrying members, and wherein said transfer means includes plural members associated with said image carrying members, the images of different colors being transferred successively to the same image receiving member in a superposed manner.

29. An image forming apparatus according to claim 27, wherein said transfer means is movable by said moving means to one of said first, second and third positions together with said feeding means.

30. An image forming apparatus according to claim 21, wherein said feeding means is common to said plurality of image carrying members.

31. An image forming apparatus according to claim 21, wherein said feeding means is a belt-like means.

32. An image forming apparatus according to claim 21, wherein said transfer means is movable by said moving means to one of said first, second and third positions together with said feeding means.

33. An image forming apparatus according to claim 21 or 28, wherein said image carrying means includes an electrophotographic photosensitive member and said image forming means includes a laser beam scanner capable of delivering light information corresponding to image information to said electrophotographic photosensitive member.

34. An image forming apparatus comprising:

image forming means, including a plurality of movable image carrying means, corresponding to said image carrying means for forming images corresponding to image information on respective image carrying means;

transfer means corresponding to said image carrying means for transferring the images on the respective image carrying means to an image receiving member;

feeding means defining a closed path for feeding said image receiving member to positions where images are transferred thereto from respective image carrying means;

moving means for moving said feeding means between a first position where said feeding means is operable with the respective image carrying means and a second position where said feeding means is retracted from said first position;

detecting means for detecting a feeding failure of said image receiving member in the feed path of said image receiving member; and transmitting member for transmitting a signal to said moving means, thereby to move said feeding means to said second position in response to the detection by said detecting means.

35. An image forming apparatus according to claim 34, wherein said transfer means is movable by said moving means together with said feeding means.

36. An image forming apparatus according to claim 34, wherein said plurality of image carrying means carry images of different colors which are successively transferred by said transfer means to the same image receiving member in a superposed manner.

37. An image forming apparatus according to claim 34, wherein said image carrying means includes electrophotographic photosensitive members and said image forming means includes laser beam scanners capable of delivering light information corresponding to image information to said electrophotographic photosensitive members.

* * * * *

UNITED STATES PATENT AND TRADEMARK OFFICE
CERTIFICATE OF CORRECTION

PATENT NO. : 4,873,541

DATED : October 10, 1989

INVENTOR(S) : YOSHIHIKO HIROSE, ET AL.

It is certified that error appears in the above-identified patent and that said Letters Patent is hereby corrected as shown below:

ON TITLE PAGE:

IN [56] REFERENCES CITED

FOREIGN PATENT DOCUMENTS, "54137347 6/1988 Japan" should read --54-137347 10/1979 Japan--.

IN [57] ABSTRACT

Line 6, "correspoding" should read --corresponding--.

SHEET 8 OF 16

FIG. 8(A), "FOMING" should read --FORMING--.

SHEET 13 OF 16

Figure 10C:
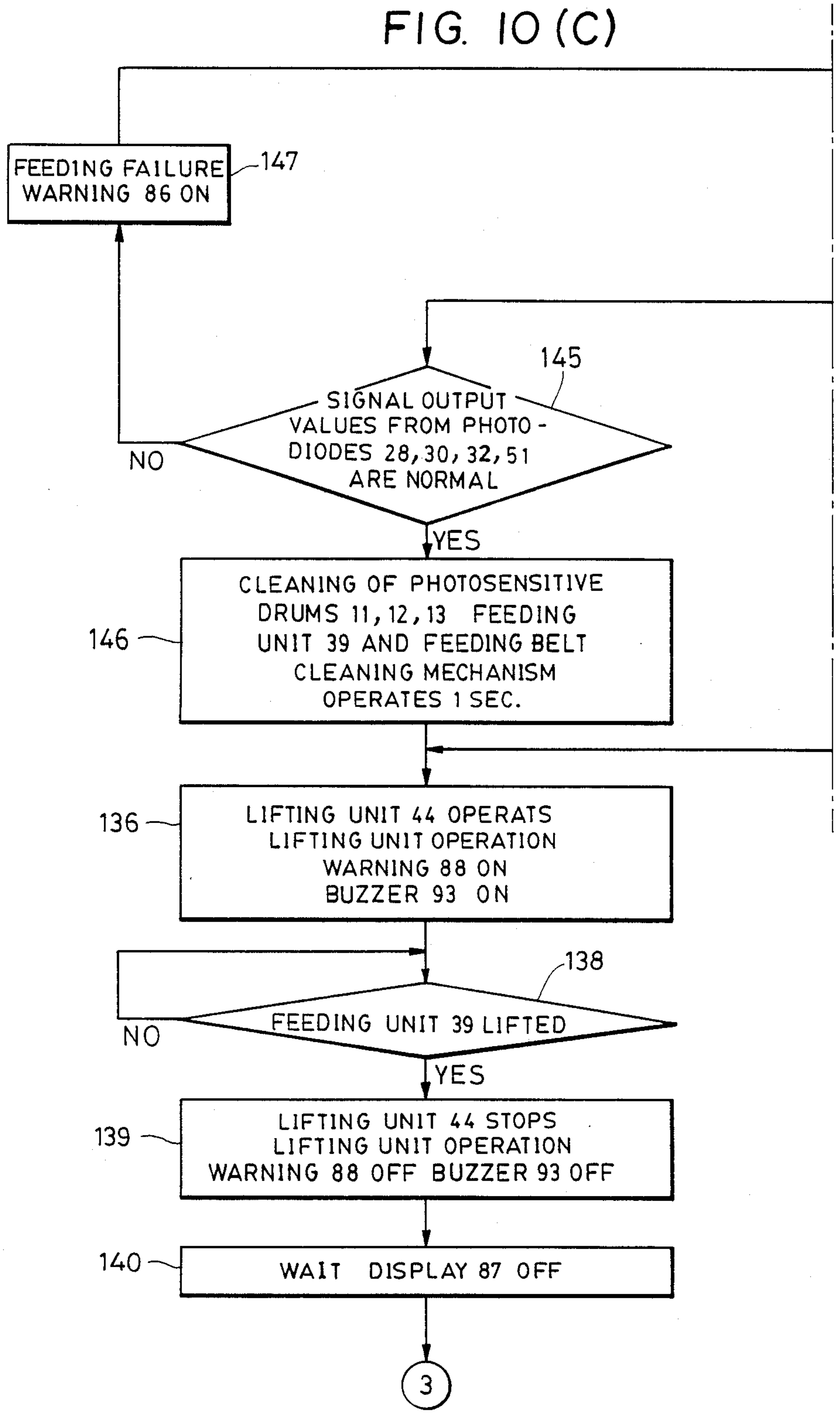

FIG. 10(C), "OPERATS" should read --OPERATES--.

SHEET 14 OF 16

Figure 11:
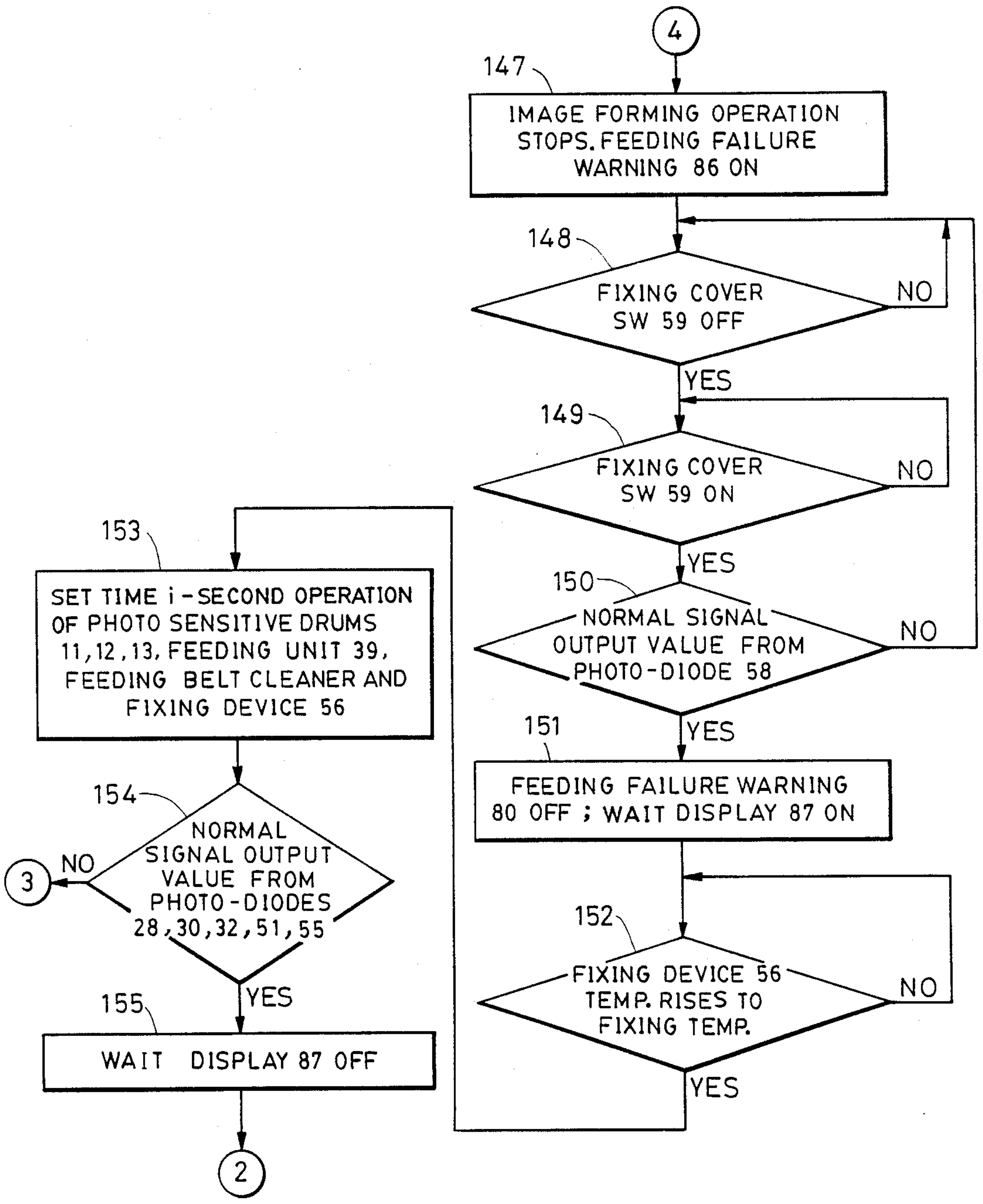
Figure 12:
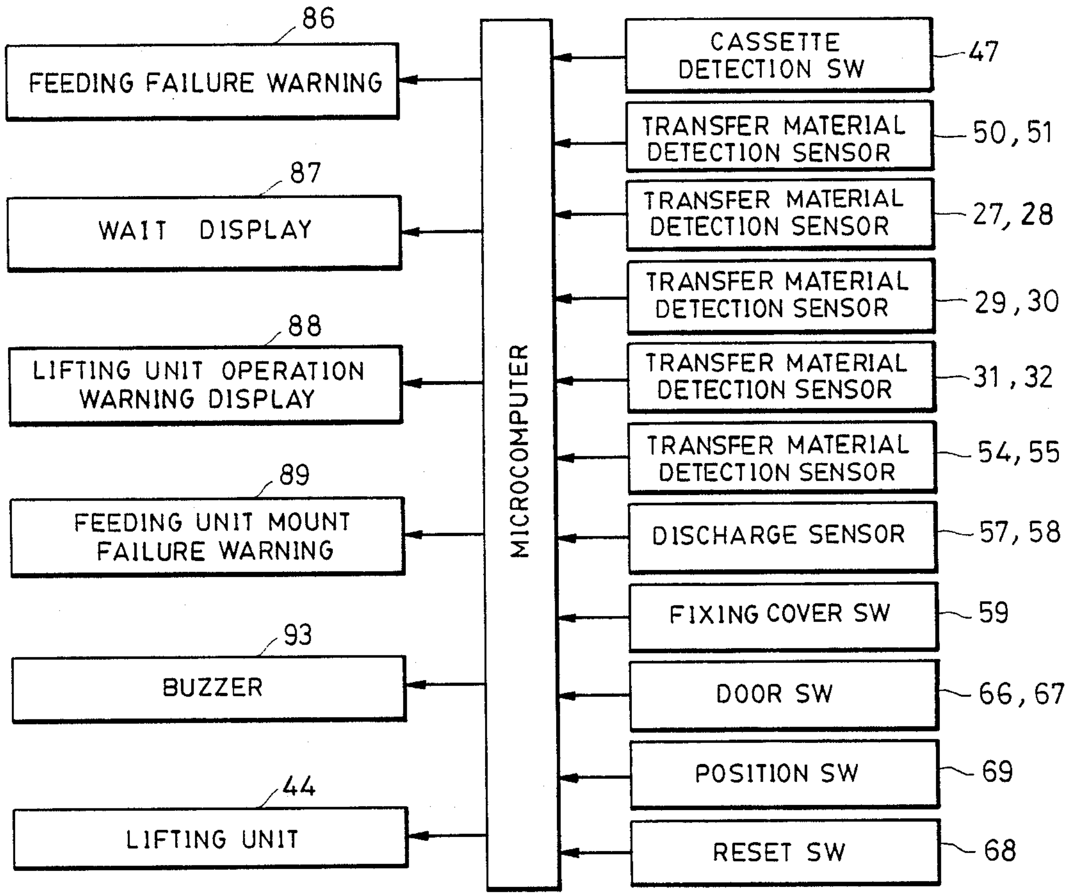
FIG. 12 is a block diagram of a control section of the laser beam printer shown in FIG. 1.

FIG. 11, "PHOTO SENSITIVE" should read --PHOTOSENSITIVE--.

COLUMN 1

Line 49, "image receiving members" should read --image receiving member--.
Line 53, "of" (first occurrence) should read --to--.
Line 63, "than" should read --then--.

UNITED STATES PATENT AND TRADEMARK OFFICE

CERTIFICATE OF CORRECTION

PATENT NO. : 4,873,541
DATED : October 10, 1989
INVENTOR(S) : YOSHIHIKO HIROSE, ET AL.

It is certified that error appears in the above-identified patent and that said Letters Patent is hereby corrected as shown below:

COLUMN 2

Line 29, "position" should read --positions--.

COLUMN 3

Line 47, "receving" should read --receiving--.
Line 51, "receving" should read --receiving--.
Line 53, "receving" should read --receiving--.
Line 61, "if" should read --is--.

COLUMN 9

Line 15, "discharge cover 53," should read --discharge cover 63,--.
Line 61, "26," should read --26.--.

COLUMN 13

Line 38, "amount" should read --an amount--.

COLUMN 15

Line 25, "the feeding belt 26" should read --on the feeding belt 26--.

UNITED STATES PATENT AND TRADEMARK OFFICE
CERTIFICATE OF CORRECTION

PATENT NO. : 4,873,541

DATED : October 10, 1989

INVENTOR(S) : YOSHIHIKO HIROSE, ET AL.

It is certified that error appears in the above-identified patent and that said Letters Patent is hereby corrected as shown below:

COLUMN 16

Line 5, delete "land".
Line 8, "photo-didoes" should read --photo-diodes--.
Line 65, "level the output signal" should read --the level of the output signal--.

COLUMN 18

Line 12, "maybe" should read --may be--.
Line 23, "ink" should read --link--.
Line 41, "he" should read --the--.

COLUMN 19

Line 20, "feeding device" should read --the feeding device--.

COLUMN 22

Line 19, "contact" should read --are contactable with--.
Line 36, "27," should read --28,--.

UNITED STATES PATENT AND TRADEMARK OFFICE

CERTIFICATE OF CORRECTION

PATENT NO. : 4,873,541

DATED : October 10, 1989

INVENTOR(S) : YOSHIHIKO HIROSE, ET AL.

It is certified that error appears in the above-identified patent and that said Letters Patent is hereby corrected as shown below:

COLUMN 23

Line 12, "transmitting member" should read --transmitting means--.

Signed and Sealed this

Twenty-first Day of May, 1991

Attest:

HARRY F. MANBECK, JR.

Attesting Officer

Commissioner of Patents and Trademarks